United States Patent
Wu et al.

(10) Patent No.: US 11,662,427 B2
(45) Date of Patent: May 30, 2023

(54) METHOD AND SYSTEM FOR FREQUENCY OFFSET MODULATION RANGE DIVISION MIMO AUTOMOTIVE RADAR

(71) Applicant: NXP USA, Inc., Austin, TX (US)

(72) Inventors: Ryan Haoyun Wu, San Jose, CA (US); Douglas Alan Garrity, Gilbert, AZ (US); Maik Brett, Taufkirchen (DE)

(73) Assignee: NXP USA, Inc., Austin, TX (US)

( * ) Notice: Subject to any disclaimer, the term of this patent is extended or adjusted under 35 U.S.C. 154(b) by 264 days.

(21) Appl. No.: 16/707,224

(22) Filed: Dec. 9, 2019

(65) Prior Publication Data

US 2021/0173042 A1  Jun. 10, 2021

(51) Int. Cl.
*G01S 7/35* (2006.01)
*G01S 7/03* (2006.01)
*H04J 3/02* (2006.01)

(52) U.S. Cl.
CPC ............. *G01S 7/354* (2013.01); *G01S 7/03* (2013.01); *H04J 3/02* (2013.01); *G01S 7/358* (2021.05)

(58) Field of Classification Search
CPC . G01S 7/354; G01S 7/03; G01S 7/358; G01S 7/4056; G01S 3/788; H04J 3/02; H04J 3/00; H04B 7/12; H04B 7/0413; H04B 2001/6912; G05B 2219/25177; G10H 2250/501; H04L 27/00; H04L 27/10; H04L 27/103
See application file for complete search history.

(56) References Cited

U.S. PATENT DOCUMENTS

| | | | |
|---|---|---|---|
| 5,555,257 A | 9/1996 | Dent | |
| 5,748,623 A | 5/1998 | Sawahashi et al. | |
| 6,606,583 B1 | 8/2003 | Sternberg et al. | |
| 7,733,980 B2 | 6/2010 | Beukema et al. | |
| 8,077,076 B2 * | 12/2011 | Walter | G01S 13/345 342/70 |

(Continued)

FOREIGN PATENT DOCUMENTS

DE   102006032539 A1   1/2008
WO   2018/155439 A1    8/2018

OTHER PUBLICATIONS

F G Jansen, "Automotive Radar Doppler Division MIMO With Velocity Ambiguity Resolving Capabilities", 2019 16th European Radar Conference, Oct. 2, 2019, EUMA, pp. 245-248.

(Continued)

*Primary Examiner* — Vladimir Magloire
*Assistant Examiner* — Yonghong Li

(57) ABSTRACT

A radar system, apparatus, architecture, and method are provided for generating a transmit reference or chirp signal to produce a plurality of transmit signals having different frequency offsets from the transmit reference signal for encoding and transmission as N radio frequency encoded transmit signals which are reflected from a target and received at a receive antenna as a target return signal that is down-converted to an intermediate frequency signal and converted by a high-speed analog-to-digital converter to a digital signal that is processed by a radar control processing unit which performs fast time processing steps to generate a range spectrum comprising N segments which correspond, respectively, to the N radio frequency encoded transmit signals transmitted over the N transmit antennas.

19 Claims, 23 Drawing Sheets

(56) References Cited

U.S. PATENT DOCUMENTS

| | | | |
|---|---|---|---|
| 8,466,829 | B1 | 6/2013 | Volman et al. |
| 9,448,302 | B2 | 9/2016 | Schoor et al. |
| 9,541,638 | B2 | 1/2017 | Jansen et al. |
| 10,718,860 | B2* | 7/2020 | Santra .................. G01S 7/35 |
| 10,855,328 | B1* | 12/2020 | Gulati .................. G01S 7/0232 |
| 2004/0180635 | A1 | 9/2004 | Choi et al. |
| 2009/0323796 | A1 | 12/2009 | Futatsugi et al. |
| 2012/0213204 | A1 | 8/2012 | Noh et al. |
| 2014/0178077 | A1 | 6/2014 | Sun et al. |
| 2017/0031005 | A1 | 2/2017 | Jaeger et al. |
| 2017/0307729 | A1 | 10/2017 | Eshraghi et al. |
| 2018/0120427 | A1 | 5/2018 | Cornic et al. |
| 2018/0252809 | A1 | 9/2018 | Davis et al. |
| 2018/0302205 | A1 | 10/2018 | Abedini et al. |
| 2019/0056478 | A1 | 2/2019 | Millar |
| 2019/0212428 | A1 | 7/2019 | Santra et al. |
| 2020/0081110 | A1* | 3/2020 | Nam ................... G01S 13/931 |
| 2020/0103515 | A1* | 4/2020 | Kishigami ............ G01S 13/343 |
| 2021/0072346 | A1* | 3/2021 | Bogner ................. G01S 13/584 |

OTHER PUBLICATIONS

Feger, Reinhard et al., "A Frequency-Division MIMO FMCW Radar System Based on Delta-Sigma Modulated Transmitters", IEEE Transactions on Microwave Theory and Techniques, Dec. 1, 2014, pp. 3572-3581, vol. 62, No. 12, IEEE, Piscataway, NJ, USA.

NG, Herman Jalli et al., "A Scalable Four-Channel Frequency-Division Multiplexing MIMO Radar Utilizing Single-Sideband Delta-Sigma Modulation", IEEE Transactions on Microwave Theory and Techniques, Nov. 1, 2019, vol. 67, No. 11, IEEE, Piscataway, NJ, USA.

Pfeffer, C. et al., "An IQ-Modulator Based Heterodyne 77-GHz FMCW Colocated MIMO Radar System", 2012 IEEE MTT-S International Microwave Symposium Digest, Jun. 17, 2012, pp. 1-3, IEEE, Piscataway, NJ, USA.

* cited by examiner

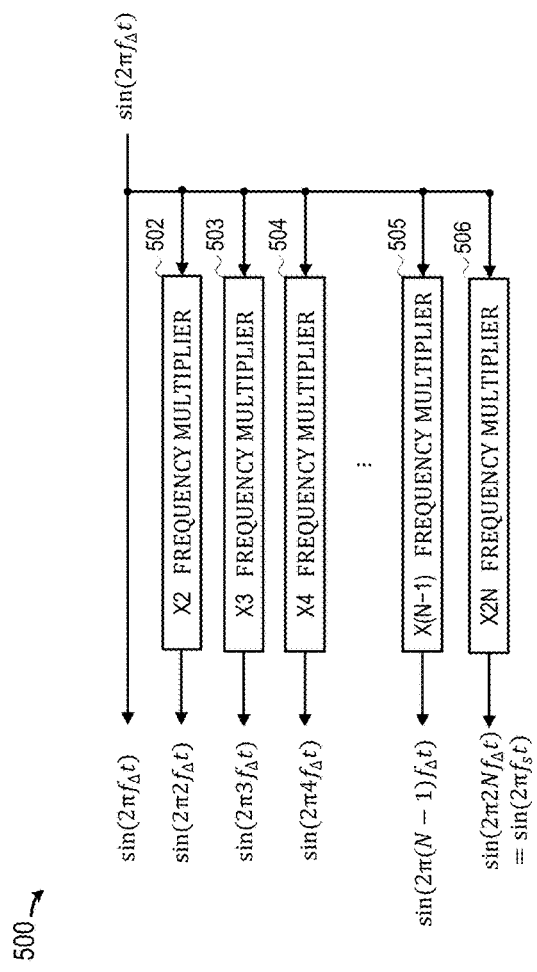
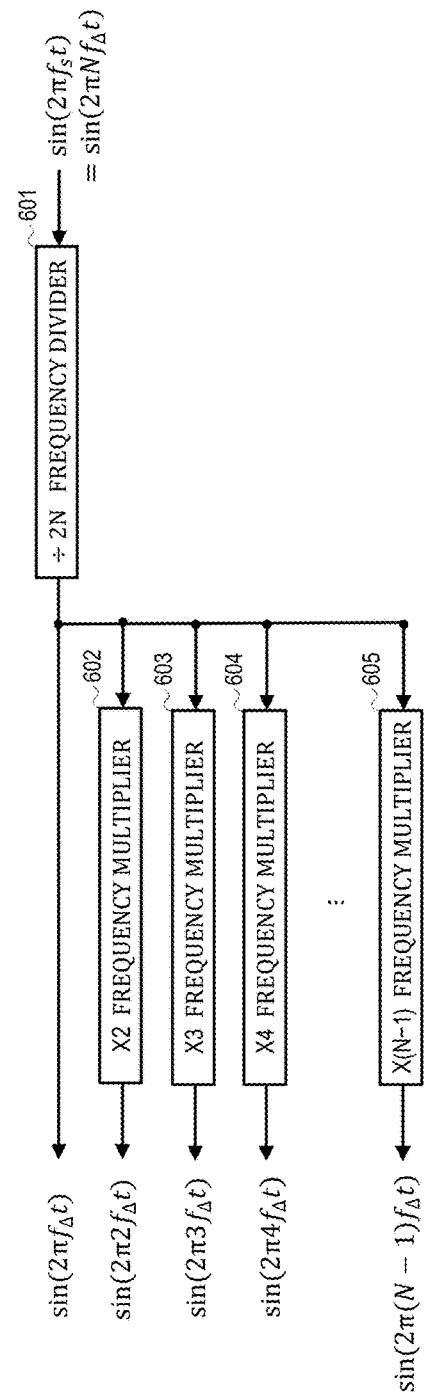
Figure 5
Figure 6

METHOD AND SYSTEM FOR FREQUENCY OFFSET MODULATION RANGE DIVISION MIMO AUTOMOTIVE RADAR

CROSS-REFERENCE TO RELATED APPLICATIONS

U.S. patent application Ser. No. 16/707,235, entitled "Method and System for Frequency Offset Modulation Range Division MIMO Automotive Radar Using I-Channel Only Modulation Mixer," by inventors Ryan Haoyun Wu, Douglas Alan Garrity, and Maik Brett, filed on Dec. 9, 2019, describes exemplary methods and systems and is incorporated by reference in its entirety.

BACKGROUND OF THE INVENTION

Field of the Invention

The present invention is directed in general to radar systems and associated methods of operation. In one aspect, the present invention relates to an automotive radar system formed with multiple-input, multiple-output (MIMO) monostatic (co-located) and multi-static (distributed) radar arrays.

Description of the Related Art

Radar systems may be used to detect the range, velocity, and angle of nearby targets. With advances in technology, radar systems may now be applied in many different applications, such as automotive radar safety systems, but not every radar system is suitable for every application. For example, 77 GHz Frequency Modulation Continuous Wave (FMCW) Fast Chirp Modulation (FCM) radars are used as with very large MIMO arrays as sensors in Advanced Driver Assistance System (ADAS) and autonomous driving (AD) systems. Since the number of virtual antennas constructed with the MIMO approach (which equals the product of the number of physical transmit and receiver antenna elements) is larger than the total number of physical elements, the resulting MIMO array can form a larger aperture, resulting in improved angular resolution. However, MIMO systems can have difficulty distinguishing between Linear Frequency Modulation (LFM) waveforms transmitted by different transmit antennas.

Existing radar systems have attempted to address these challenges by using time-division (TD) multiplexing techniques to separate LFM waveforms from different transmitters in time, thereby separating signals originated from distinct transmitters at each receiving channel for constructing a virtual MIMO array. In particular, existing TD MIMO implementations are configured to schedule a sequence of transmit chirps (LFM waveforms) by individual transmit antennas one element or subarray at a time, meaning that the amount of time required to transmit all chirps is increased as the number of transmit antennas is increased. Unfortunately, because the coherent dwell time (i.e., the time duration an echo signal of a target can be coherently integrated on a moving target) is usually limited, the number of transmitters that can be used with TD-MIMO systems is limited. Another drawback with convention al TD-MIMO systems is that longer frame or chirp sequence durations may lead to multiple-times decrease in the maximum Doppler shift (or effectively, radial velocity of a target) that can be measured without ambiguity, again limiting the number of transmitters that may be used for TD-MIMO systems. As a result, TD-MIMO systems are typically confined to using a small number of transmitters (e.g., 3) to construct a relatively small MIMO virtual array. As seen from the foregoing, the existing radar system solutions are extremely difficult at a practical level by virtue of the challenges with achieving the performance benefits of larger size radars within the performance, design, complexity and cost constraints of existing radar system applications.

BRIEF DESCRIPTION OF THE DRAWINGS

The present invention may be understood, and its numerous objects, features and advantages obtained, when the following detailed description of a preferred embodiment is considered in conjunction with the following drawings.

FIG. 5 is a simplified schematic block diagram of frequency offset modulation generator in accordance with a first selected embodiment of the present disclosure.

FIG. 6 is simplified schematic block diagram of frequency offset modulation generator in accordance with a second selected embodiment of the present disclosure.

DETAILED DESCRIPTION

Figure 1:
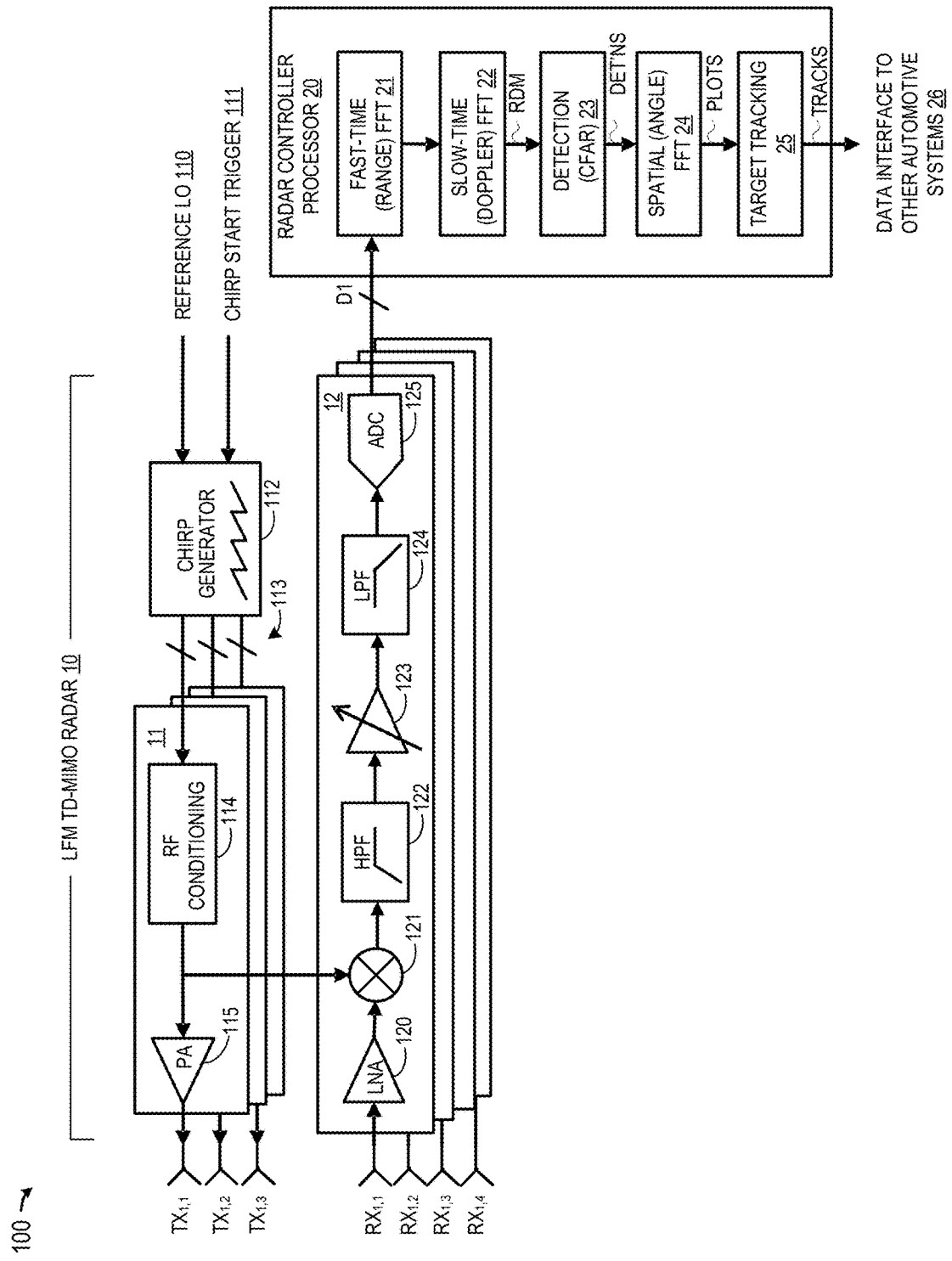
FIG. 1 is a simplified schematic block diagram of a conventional LFM TD-MIMO automotive radar system.

A frequency offset modulation range and time division MIMO radar system, hardware circuit, system, architecture, and methodology are described for combining linear frequency modulation (LFM) time-division (TD) MIMO with frequency offset modulation (FOM) range division MIMO to construct very large MIMO arrays for use with frequency modulation continuous wave (FMCW) radars. In selected embodiments, a signal processing methodology and apparatus are disclosed for mixing the LFM waveform (transmit chirp) at each transmit channel with different frequency offset signals (e.g., $\Delta f$, $2\Delta f$, etc.) using a frequency offset mixer with increased ADC sampling rate to allow the separation of transmitters' signals on receive in the range spectrum, thereby enabling very large MIMO array formation at the receiver. With each transmit channel transmitting a different frequency offset modulation LFM signal, the receiver can process and separate the transmit channel signals in the fast-time Fourier or the range domain, thereby defining an LFM range-division (RD) MIMO approach for differentiating between transmit channel signals. In selected embodiments, the frequency offset mixer may be implemented with an I/Q channel modulation mixer, an I-channel only modulation mixer, or a Q-channel only modulation mixer to implement a spectrum-coherent integration approach. In embodiments where the FOM mixer is implemented with an I-channel only modulation mixer or a Q-channel only modulation mixer with a spectrum domain coherent integration approach, the complexity of the hardware implementations is greatly reduced. In other embodiments, a signal processing methodology and apparatus are disclosed for frequency shifting the LFM waveform (transmit chirp) at each transmit channel with different fast-time phase shifters prior to transmit filtering and amplification, thereby enabling very large MIMO array formation at the receiver. With each transmit channel transmitting a different frequency offset modulation LFM signal that is generated with a fast-time phase shifter, there is no requirement of a frequency offset mixer at each transmit channel, and a high speed analog-to-digital converter at the receiver can process and separate the transmit channel signals in the fast-time Fourier or the range domain, thereby defining an LFM range-division (RD) MIMO approach for differentiating between transmit channel signals. Because of the simultaneous transmissions of FOM RD MIMO, the frame duration can be kept short, thereby avoiding the problem associated with prolonged frame duration of TD MIMO systems. The resulting FOM RD MIMO virtual array is much larger than the conventional TD-MIMO approach, and can provide high angular resolution performance. In selected embodiments, a signal processing methodology and apparatus are disclosed for combining the FOM RD MIMO approach with TD MIMO approach, such as by defining multiple transmit time slots such that alternating transmit channels (e.g., even number transmitter) are active in a first time slot and are suppressed in a second time slot. In this configuration, for each transmitter, its adjacent range spectrum segment is vacant, thereby enabling strong beyond-the-range targets to be correctly detected without imposing target interference. By providing hardware and software solutions for using frequency offset modulation in combination with time-division techniques to transmit LFM waveforms from multiple transmit channels, the disclosed frequency offset modulation range and time division MIMO radar system and methodology efficiently provide a MIMO virtual array having an aperture that is many times larger than the total physical apertures combined, thereby achieving better sensitivity, finer angular resolution, and low false detection rate.

In the context of the present disclosure, it will be appreciated that radar systems may be used as sensors in a variety of different applications, including but not limited to automotive radar sensors for road safety systems, such as advanced driver-assistance systems (ADAS) and autonomous driving (AD) systems. In such applications, the radar systems are used to measure the radial distance to a reflecting object, its relative radial velocity, and angle information, and are characterized by performance criteria, such as the angular resolution (the minimum distance between two equal large targets at the same range and range rate (or radial velocity) resolution cell which a radar is able to distinguish and separate to each other), sensitivity, false detection rate, and the like. Typically, frequency modulated continuous wave (FMCW) modulation radars are used to identify the distance, velocity, and/or angle of a radar target, such as a car or pedestrian, by transmitting Linear Frequency Modulation (LFM) waveforms from multiple transmit antennas so that reflected signals from the radar target are received at multiple receive antennas and processed to determine the radial distance, relative radial velocity, and angle (or direction) for the radar target. However, with current automotive designs, a vehicle can include multiple radar transmitters which can operate independently from one another. As a result, the LFM waveform transceivers may be configured to implement time-division (TD) MIMO operations to temporally separate signals originated from distinct transmitters so that a receiving channel can distinctly detect each signal and thereby construct a virtual MIMO array.

To illustrate the design and operation of a conventional TD MIMO radar system, reference is now made to FIG. 1 which depicts a simplified schematic block diagram of a conventional LFM TD-MIMO automotive radar system 100 which includes an LFM TD-MIMO radar device 10 connected to a radar controller processor 20. In selected embodiments, the LFM TD-MIMO radar device 10 may be embodied as a line-replaceable unit (LRU) or modular component that is designed to be replaced quickly at an operating location. Similarly, the radar controller processor 20 may be embodied as a line-replaceable unit (LRU) or modular component. Although a single or mono-static LFM TD-MIMO radar device 10 is shown, it will be appreciated that additional distributed radar devices may be used to form a distributed or multi-static radar. In addition, the depicted radar system 100 may be implemented in integrated circuit form with the LFM TD-MIMO radar device 10 and the radar controller processor 20 formed with separate integrated circuits (chips) or with a single chip, depending on the application.

Each radar device 10 includes one or more transmitting antenna elements $TX_i$ and receiving antenna elements $RX_j$ connected, respectively, to one or more radio-frequency (RF) transmitter (TX) units 11 and receiver (RX) units 12. For example, each radar device (e.g., 10) is shown as including individual antenna elements (e.g., $TX_{1,i}$, $RX_{1,j}$) connected, respectively, to three transmitter modules (e.g., 11) and four receiver modules (e.g., 12), but these numbers are not limiting and other numbers are also possible, such as four transmitter modules 11 and six receiver modules 12, or a single transmitter module 11 and/or a single receiver modules 12. Each radar device 10 also includes a chirp generator 112 which is configured and connected to supply a chirp input signal to the transmitter modules 11. To this end, the chirp generator 112 is connected to receive a separate and independent local oscillator (LO) signal 110 and a chirp start trigger signal 111, though delays are likely to be different due to the signal path differences and programmable digital delay elements in the signal paths. Chirp signals 113 are generated and transmitted to multiple transmitters 11, usually following a pre-defined transmission schedule, where they are filtered at the RF conditioning module 114 and amplified at the power amplifier 115 before being fed to the corresponding transmit antenna $TX_{1,i}$ and radiated. By sequentially using each transmit antenna $TX_{1,i}$ to transmit successive pulses in the chirp signal 113, each transmitter element 11 operates in a time-multiplexed fashion in relation to other transmitter elements because they are programmed to transmit identical waveforms on a temporally separated schedule.

The radar signal transmitted by the transmitter antenna unit $TX_{1,i}$, $TX_{2,i}$ may by reflected by an object, and part of the reflected radar signal reaches the receiver antenna units $RX_{1,i}$ at the radar device 10. At each receiver module 12, the received (radio frequency) antenna signal is amplified by a low noise amplifier (LNA) 120 and then fed to a mixer 121 where it is mixed with the transmitted chirp signal generated by the RF conditioning unit 113. The resulting intermediate frequency signal is fed to a first high-pass filter (HPF) 122. The resulting filtered signal is fed to a first variable gain amplifier 123 which amplifies the signal before feeding it to a first low pass filter (LPF) 124. This re-filtered signal is fed to an analog/digital converter (ADC) 125 and is output by each receiver module 12 as a digital signal D1. The receiver module compresses target echo of various delays into multiple sinusoidal tones whose frequencies correspond to the round-trip delay of the echo.

The radar system 100 also includes a radar controller processing unit 20 that is connected to supply input control signals to the radar device 10 and to receive therefrom digital output signals generated by the receiver modules 12. In selected embodiments, the radar controller processing unit 20 may be embodied as a micro-controller unit (MCU) or other processing unit that is configured and arranged for signal processing tasks such as, but not limited to, target identification, computation of target distance, target velocity, and target direction, and generating control signals. The radar controller processing unit 20 may, for example, be configured to generate calibration signals, receive data signals, receive sensor signals, generate frequency spectrum shaping signals (such as ramp generation in the case of FMCW radar) and/or register programming or state machine signals for RF (radio frequency) circuit enablement sequences. In addition, the radar controller processor 20 may be configured to program the modules 11 to operate in a time-division fashion by sequentially transmitting LFM chirps for coordinated communication between the transmit antennas $TX_{1,i}$, $RX_{1,j}$. The result of the digital processing at the radar controller processing unit 20 is that the digital domain signals D1 are processed for the subsequent fast-time range FFT 21, slow-time Doppler FFT 22, constant false alarm rate (CFAR) target detection 23, spatial angle estimation 24, and target tracking processes 25, with the result being output 26 to other automotive computing or user interfacing devices for further process or display.

Figure 2:
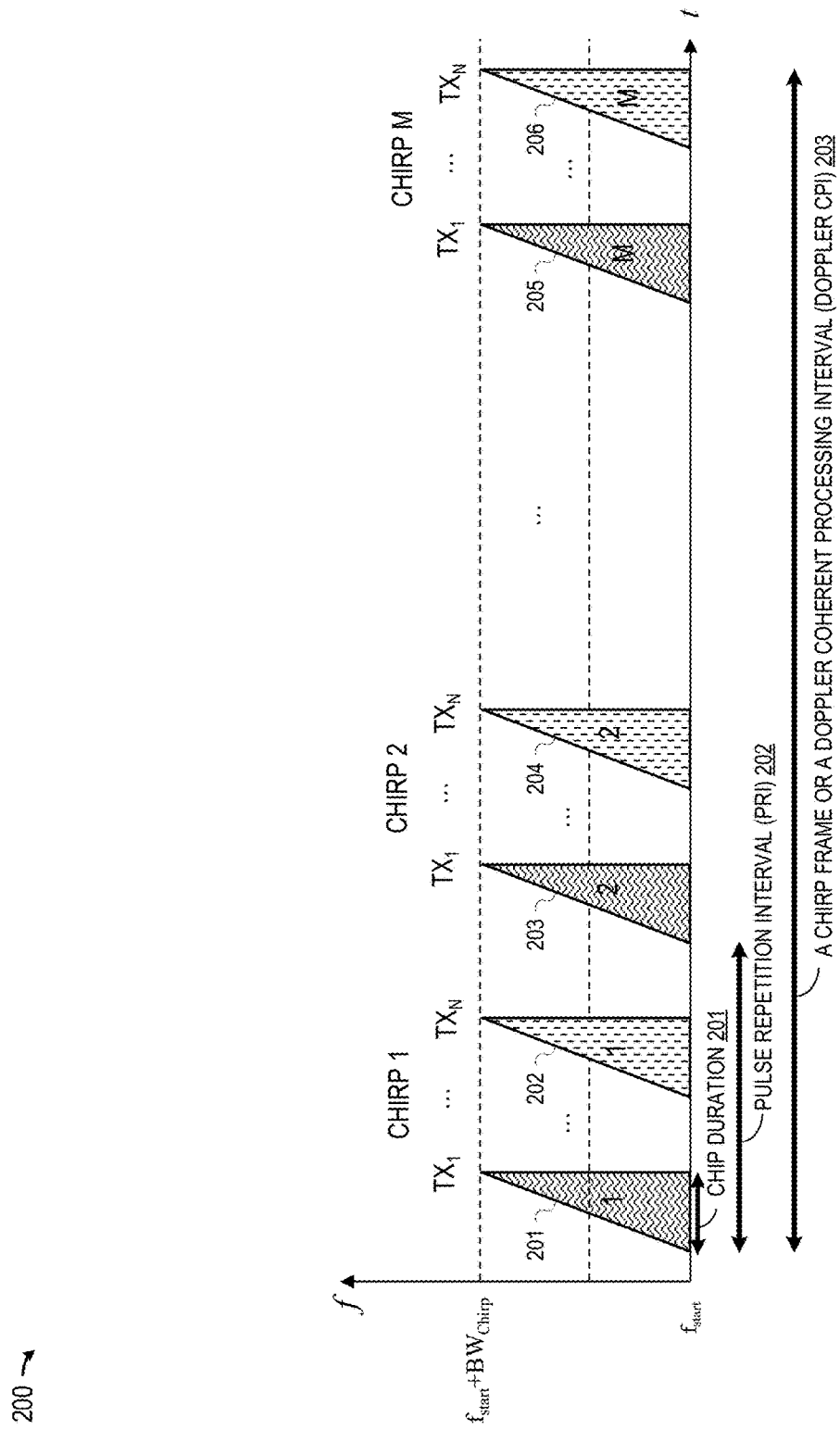
FIG. 2 is a timing diagram illustrating a chirp transmission schedule for an LFM TD-MIMO automotive radar system.

To illustrate an example of time division transmission of radar transmit signals, reference is now made to FIG. 2 which depicts a timing diagram illustration 200 of a chirp transmission schedule for an LFM TD-MIMO automotive radar system. As depicted, each transmitter (e.g., $TX_1$, etc.) is programed to take turns transmitting one chirp (e.g., 201) of a sequence of chirps 201-206. This temporal separation of chirp transmission by each transmit antenna allows the separation of transmitters at the receiving end by simply associating the received signal with the scheduled transmitter. The ability to separate transmitters in the received signal is a prerequisite of the MIMO radar approach, which is routinely used in automotive radars for constructing a virtually large antenna array aperture compared to the physical aperture of the transmit and receive antennas. The larger aperture constructed virtually via MIMO provides better angular resolution performance which is required by many advanced driver assistance system (ADAS) and autonomous driving (AD) applications. The use of a transmitter schedule to divide the time-domain resources amongst the transmitters when forming a virtual MIMO array is referred to as a time division (TD) MIMO approach.

Since the TD-MIMO approach provides a relatively straightforward way to separate transmitters with little or no leakage, it is routinely used in automotive radar applications. However, the requirement of dividing time between resources means that a much longer frame duration is required to complete the transmission of all chirps for each transmitter. If the prolonged frame duration is longer than the duration a target stays within a single range resolution cell, any range migration by the target can degrade the subsequent digital Doppler coherent integration processing and angle estimation, thereby adversely impacting measurement performance.

Another drawback with conventional TD-MIMO approaches is the increase in the duration of the pulse repetition intervals (PRI) between adjacent pulses of the same transmitter. In particular, with each transmitter (e.g., $TX_1$-$TX_N$) being scheduled to take its turn to transmit their first pulses (e.g., 201-202) before beginning the sequential transmission of the second pulses (e.g., 203-204), and so on until the last pulses (e.g., 205-206) are transmitted, the pulse repetition interval (PRI) 202 between two adjacent pulses of the same transmitter is also prolonged. Because the maximum unambiguous Doppler shift measurable by the chirp sequence is inversely related to the PRI, a lengthened PRI results in reduced maximum unambiguous Doppler performance. As a result, the maximum number of transmitters that can be used for TD-MIMO operation is limited. For typical road use, up to 3 transmitters may be used for TD MIMO without unacceptable performance degradation.

Figure 3A:
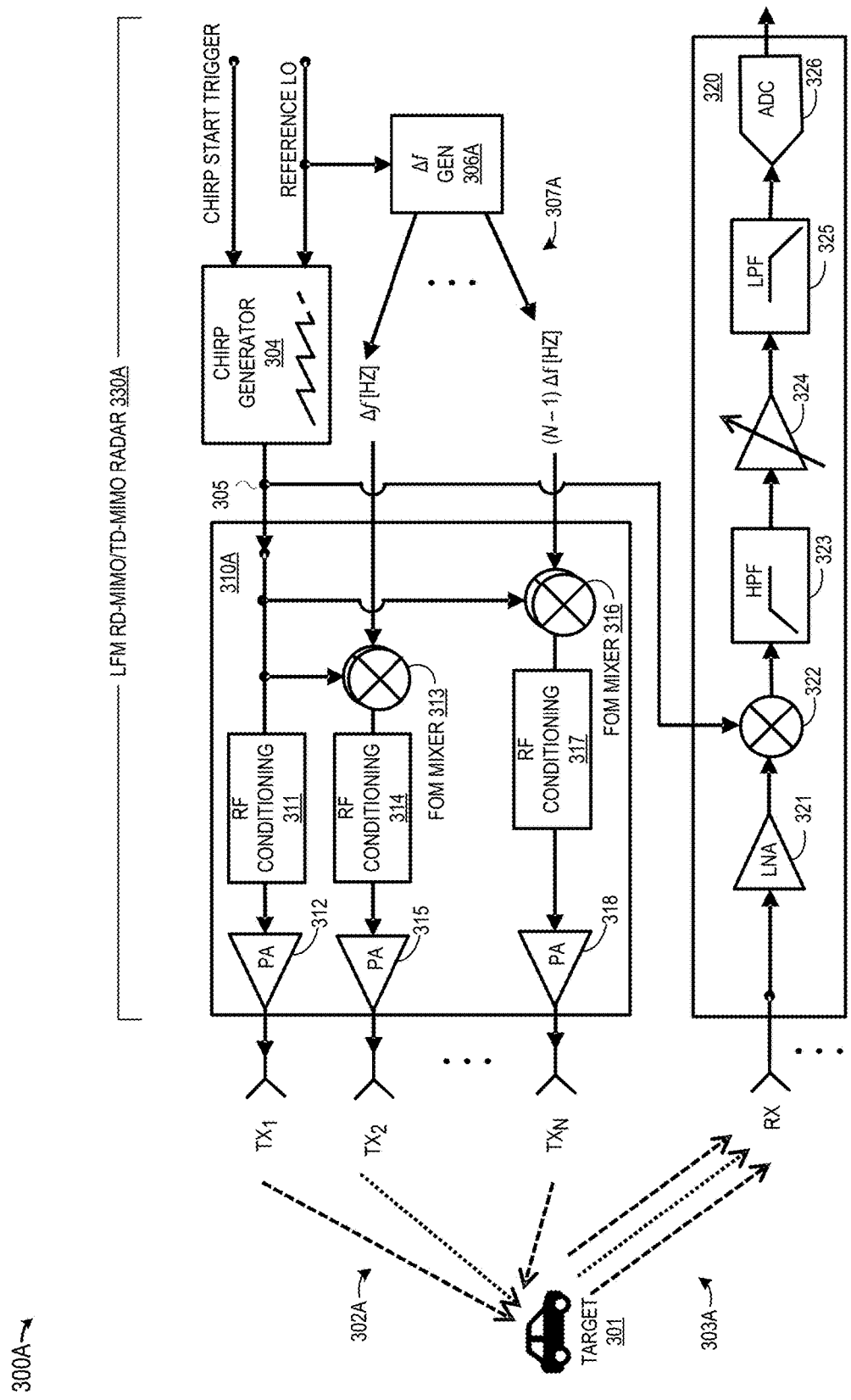
FIG. 3A is a simplified schematic block diagram of a frequency offset modulation LFM range division MIMO automotive radar system implemented with FOM modulation mixers in accordance with selected first embodiments of the present disclosure.

To address these limitations from conventional solutions and others known to those skilled in the art, reference is now made to FIG. 3A which depicts a simplified schematic block diagram of a frequency offset modulation LFM range division MIMO automotive radar system 300A which includes an LFM RD-MIMO radar device 330A having a transmit module 310A and receiver module 320 which are connected and configured to transmit and receive LFM waveforms 302A, 303A for reflection by a target 301 under control of a radar controller processor (not shown). In selected embodiments, the LFM RD-MIMO radar device 330A and/or radar controller processor may be embodied as a line-replaceable unit (LRU) or modular component that is designed to be replaced quickly at an operating location. In addition and as described hereinbelow, the LFM RD-MIMO radar device 330A may also be configured to perform time-division multiplexing of the transmitted LFM waveforms 302A, 303A to implement a combined time-division and range-division MIMO scheme to separate the transmitters not only in the range domain, but also in the time domain.

Each radar device 330A includes one or more transmitting antenna elements $TX_i$ and at least a first receiving antenna element RX connected, respectively, to one or more radio-frequency (RF) transmit modules 310A and receive module 320. At each transmit module 310A, a transmit channel circuit is provided for each transmit antenna. For example, a first transmit channel circuit includes a first RF conditioning module 311 and power amplifier 312 connected to a first transmit antenna $TX_1$, a second transmit channel circuit includes a second RF conditioning module 314 and power amplifier 315 connected to a second transmit antenna $TX_2$, and so on with the Nth transmit channel circuit including an Nth RF conditioning module 317 and power amplifier 318 connected to the Nth transmit antenna $TX_N$.

In addition, each radar device 330A includes a chirp generator 304 which is configured and connected to supply a chirp input signal 305 to the different transmit channel circuits 311/312, 314/315, 317/318 in the transmitter module(s) 310A. However, instead of providing the chirp input signal 305 directly to all of the transmit channel circuits, the radar device 330A also includes a frequency offset generator 306A and frequency offset modulator (FOM) mixers 313, 316 which are connected to shift or offset the frequency of each transmitted LFM waveform 302A by a different integer multiple of a frequency offset ($\Delta f$). To this end, the first transmit channel circuit 311/312 may be connected to directly receive the chirp input signal 305. However, the second transmit channel circuit 314/315 may include an FOM mixer 313 which is connected as an I/Q mixer to apply a first frequency offset signal $\Delta f$ to the chirp input signal 305 before being filtered and amplified by the second transmit channel circuit 314/315 for transmission over the antenna $TX_2$. In similar fashion, the remaining transmit channel circuits (e.g., 317/318) may include an FOM mixer (e.g., 316) which is connected as an I/Q mixer to apply a unique frequency offset signal (e.g., $(N-1)\Delta f$) to the chirp input signal 305 before being filtered, amplified, and radiated by the antenna (e.g., $TX_N$).

With the frequency offset generator 306A connected to receive the reference local oscillator signal LO, a plurality of predefined frequency offset signals 307A may be generated, such as by generating a different integer multiple of a frequency offset ($\Delta f$) for each transmitter channel circuit which is connected to receive a frequency offset. By shifting the center frequency of LFM waveform at each transmitter $TX_i$ according to a predefined offset frequency unique to each transmitter, frame durations can be reduced (as compared to TD schemes) to prevent range migration effect from degrading the Doppler and angle processing. In selected embodiments, the amount of frequency offsets should be sufficient such that no targets within the maximum detection range of the radar from any two transmitters overlaps in the range domain. Thus, the amount of range shift corresponds to the amount of frequency offset imposed on each transmitter and is at least the amount of the maximum detection range of the radar.

For each transmit channel circuit except the first transmit channel circuit 311/312, the frequency offset generator 306A generates a frequency offset tone based on a fundamental offset frequency $\Delta f$ that is derived from the LO signal and multiplied by an integer (e.g., 1, 2, 3, 4, ... N−1), with a different integer value being used for each transmit channel circuit. For example, the frequency offset generator 306A generates a first frequency offset tone 1×$\Delta f$ that is supplied to the FOM mixer 313 for the second transmit channel circuit 314/315. Likewise, the frequency offset generator 306A generates a second frequency offset tone 2×$\Delta f$ that is supplied to the FOM mixer for the third transmit channel circuit, and so on, with the frequency offset generator 306A generating a last frequency offset tone (N−1)×$\Delta f$ that is supplied to the FOM mixer 316 for the last transmit channel circuit 317/318. In this way, the frequency offset generator 306A provides N−1 offset tones for the transmit channel circuits. If desired, an additional 2N$\Delta f$ Hz component can be generated to drive the ADC if the sampling rate if $f_s$=2N$\Delta f$.

As will be appreciated, a variety of different configurations may be used to deploy the frequency offset generator and FOM mixers for purposes of frequency-shifting each transmit channel. For example, reference is now made to FIG. 3B which depicts a simplified schematic block diagram of a frequency offset modulation LFM range division MIMO automotive radar system 300B which includes an LFM RD-MIMO radar device 330B having a transmit module 310B and receive module 320 which are connected and configured to transmit and receive LFM waveforms 302B, 303B for reflection by a target 301 under control of a radar controller processor (not shown). As depicted, the LFM RD-MIMO radar device 330B is similar to the LFM RD-MIMO radar device 330A shown in FIG. 3B, except that the chirp input signal 305 is not directly provided to any of the transmit channel circuits. Instead, the frequency offset generator 306B and frequency offset modulator (FOM) mixers 313, 316 are connected to shift or offset the frequency of the chirp input signal 305 by a different integer multiple of a frequency offset ($\Delta f$) before being provided to any transmit channel circuit. In particular, the first transmit channel circuit 314/315 includes an FOM mixer 313 which is connected as an I/Q mixer to apply a first frequency offset signal $\Delta f$ to the chirp input signal 305 before being filtered and amplified by the first transmit channel circuit 314/315 for transmission over the antenna $TX_1$. In similar fashion, the remaining transmit channel circuits (e.g., 317/318) include an FOM mixer (e.g., 316) which is connected as an I/Q mixer to apply a unique frequency offset signal (e.g., (N)$\Delta f$) to the chirp input signal 305 before being filtered and amplified by the antenna (e.g., $TX_N$). With this configuration, the frequency offset generator 306B is connected to receive the reference local oscillator signal LO and to generate therefrom a plurality of predefined frequency offset signals 307B as a different integer multiple of a frequency offset ($\Delta f$) for each corresponding transmitter channel circuit. By shifting the center frequency of LFM waveform 302B at each transmitter $TX_i$ according to a predefined offset frequency unique to each transmitter, the combined reflected LFM waveforms 303B are received and processed by the receiver module 320 in the substantially the same way as described hereinbelow.

To ensure sufficient range space is available for division amongst all transmitters, a much longer system-describable unambiguous range extent must be provided by the fast-time sampling. Because the maximum unambiguous range extent is inversely related to the fast-time sampling interval, a faster analog-to-digital converter (ADC) is employed at each receive channel. For example, a conventional TD-MIMO FCM radar may use a 40 mega-samples-per-second (Msps) ADC, but an LFM MIMO radar device using frequency offset modulation to enable N-transmitter MIMO operation should use an ADC sampling rate that is increased to N×40 Msps. Note also that depending on the radar system requirements and also upon the actual performance of the low-pass filter that directly precedes the ADC, the sample rate of the ADC may need to be increased beyond N×40 Msps. As a result, the fast-time FFT processing can divide the spectrum into N consecutive segments, with each being associated with a corresponding transmitter. Because the transmitters are separated or divided in the range domain and the waveform is based on LFM, the approach can also be referred to as the LFM range-division (RD) MIMO approach.

With the frequency offset signals 307A, 307B applied to the chirp input signal 305 by a bank of FOM mixers 313, 316 at the transmitter channel circuits before transmission on the transmit antennas $TX_1$-$TX_N$, the combined reflected LFM waveforms 303A, 303B are received and processed by the receiver module 320. In particular, the receive antenna RX receives the combined reflected LFM waveforms 303A, 303B which are then amplified by the low noise amplifier (LNA) 321. At the I/Q mixer 322, the amplified receive signal is mixed with the reference chirp signal 305 before being conditioned for digital conversion by the high pass filter 323, variable gain amplifier 324, low pass filter 325, and analog-to-digital converter 326.

In some cases, the signal radiated from the transmitters $TX_1$-$TX_N$ is not sufficiently isolated from the receiver which can result in undesirable interference that presents itself as an artificial target at near-zero range. This is known as transmitter-to-receiver spill-over interference. In selected embodiments of the present disclosure, an analog-domain tunable and configurable notch filter bank circuit may be substituted for the high pass filter 323 for filtering out the zero-range interference in the fast-time spectrum of each transmitter. Because it is not a target return, its presence interferes with the detection of valid targets that are close in distance due the spectral skirts caused by the phase noise of the system. In addition, reflective structures (e.g., the bumper) of the car around the radar result in a close-in echo (with nearly zero range) which interferes with the detection of valid targets. Such interference can be suppressed by applying analogue filters and/or digital filters. In FMCW radar designs where an analog high-pass filter (HPF) with a tunable pass-band frequency is employed after the chirp mixer 322 to suppress the zero-range interference signals, such a single high-pass filter cannot filter out all of the multiple zero-range signals in the received FOM signal occurring at multiple non-zero frequencies. To suppress these interference signals, a bank of notch filters (also known as a comb filter) is employed where each notch filter is tuned to a corresponding zero-range frequency, thereby providing a FOM LFM RD MIMO radar with spill-over interference cancellation using a notch filter in the receive path.

Figure 4A:
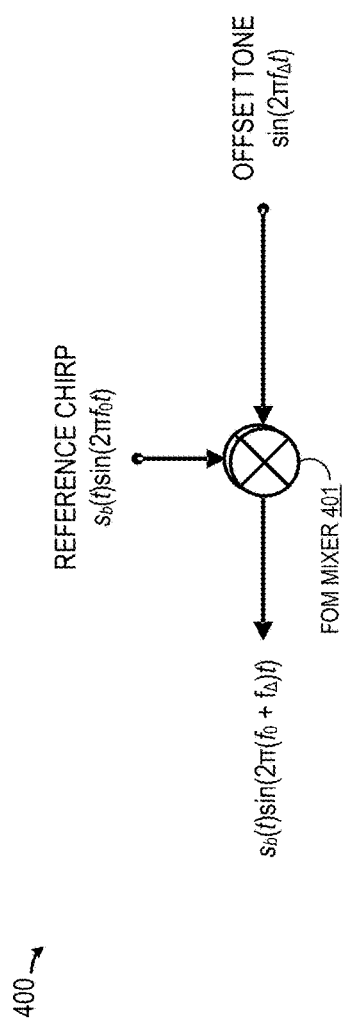
FIGS. 4A-B are simplified diagrams of the design and operation of a frequency offset modulation mixer in accordance with selected embodiments of the present disclosure.

To provide an improved understanding of how the FOM mixers 313, 316 shift the frequency of the reference chirp, reference is now made to FIG. 4A which is a simplified diagram 400 of the design and operation of a frequency offset modulation mixer 401 which shifts the frequency of the offset tone mixed with the reference chirp signal. Denoting the reference chirp signal as $s_b(t)\sin(2\pi f_0 t)$, it will be understood that $\sin(2\pi f_0 t)$ represents the carrier with a center frequency of $f_0$, and $s_b(t)$ denotes the baseband chirp waveform that is modulated by the carrier tone. Since the chirp bandwidth is much smaller than the carrier frequency, it can be treated as a narrow band signal. To shift the reference chirp's carrier frequency by $f_\Delta$, an offset tone signal $\sin(2\pi f_\Delta t)$ is generated for input to the FOM mixer 401. As indicated by the cascaded mixer symbol, the FOM mixer 401 is a I/Q mixer for mixing the LFM waveform of the reference chirp signal ($s_b(t)\sin(2\pi f_0 t)$) with a fixed frequency of the offset tone ($\sin(2\pi f_\Delta t)$).

Figure 4B:
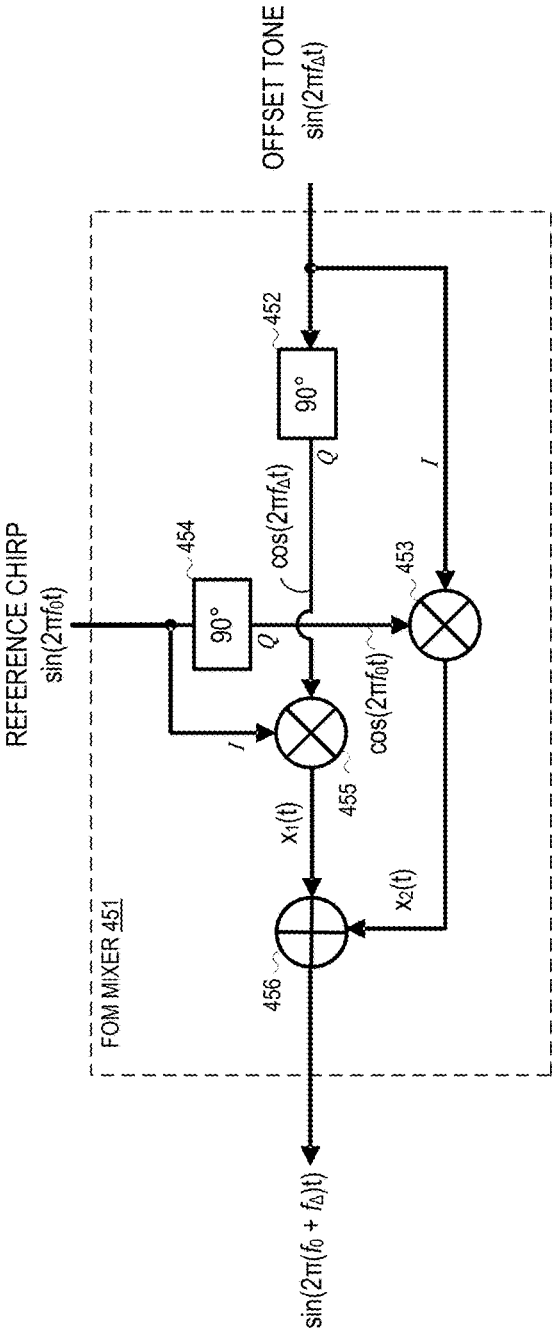

To provide additional details for an improved understanding of selected embodiments of the present disclosure, reference is now made to FIG. 4B which is a simplified diagram of the design and operation of a frequency offset modulation mixer 451. As depicted, the reference chirp input signal ($\sin(2\pi f_0 t)$) is first split into I and Q component branches, with one branch shifted by 90 degrees (at shifter 454) to generate the Q component ($\cos(2\pi f_0 t)$)) for mixing with the I component of the offset tone ($\sin(2\pi f_\Delta t)$) at the I/Q mixer 453 to produce the mixer output $x_2(t)$. In similar fashion, the I component of the reference chirp input signal ($\sin(2\pi f_0 t)$) is mixed with the 90-degree phase-shifted offset tone signal ($\cos(2\pi f_\Delta t)$) which is generated by the 90 degree shifter 452 at the I/Q mixer 455 to produce the mixer output $x_1(t)$. Finally, the I/Q mixer circuit 456 combines the outputs $x_1(t)$, $x_2(t)$ of the two mixers 453, 455 to form the final frequency offset modulated chirp signal ($\sin(2\pi(f_0+f_\Delta)t)$).

To demonstrate that the sum of the two branches is the frequency-offset modulated chirp signal, the following derivation may be established:

$$x_1(t) = \sin(2\pi f_0 t)\cos(2\pi f_\Delta t) = 0.5(\sin(2\pi(f_0+f_\Delta)t) + \sin(2\pi(f_0-f_\Delta)t))$$

$$x_2(t) = \cos(2\pi f_0 t)\sin(2\pi f_\Delta t) = 0.5(\sin(2\pi(f_0+f_\Delta)t) - \sin(2\pi(f_0-f_\Delta)t))$$

$$x_1(t) + x_2(t) = \sin(2\pi(f+f_\Delta)t)$$

For each transmit channel circuit, the frequency offset generator 306 generates a frequency offset tone based on a fundamental offset frequency $\Delta f$ that is derived from the LO signal and multiplied by an integer (e.g., 1, 2, 3, 4, ... N−1), with a different integer value being used for each transmit channel circuit. For example, the frequency offset generator 306A generates a first frequency offset tone $1 \times \Delta f$ that is supplied to the FOM mixer 313 for the second transmit channel circuit 314/315. Likewise, the frequency offset generator 306A generates a second frequency offset tone $2 \times \Delta f$ that is supplied to the FOM mixer for the third transmit channel circuit, and so on, with the frequency offset generator 306A generating a last frequency offset tone $(N-1) \times \Delta f$ that is supplied to the FOM mixer 316 for the last transmit channel circuit 317/318. In this way, the frequency offset generator 306A provides N−1 offset tones for the transmit channel circuits. If desired, an additional $2N\Delta f$ Hz component can be generated to drive the ADC if the sampling rate if $f_s = 2N\Delta f$. Note also that depending on the radar system requirements and also upon the actual performance of the low-pass filter 325 that directly precedes the ADC, the sample rate of the ADC may need to be increased beyond $f_s = 2N\Delta f$.

While any suitable frequency offset generator circuit arrangement may be used, reference is now made to FIG. 5 which depicts a simplified schematic block diagram of frequency offset modulation generator 500 in accordance with a first selected embodiment of the present disclosure. As depicted, the frequency offset modulation generator 500 is connected to receive the fundamental offset frequency tone ($\sin(2\pi f_\Delta t)$) as an input, and to output the received frequency tone as a first output offset frequency tone ($\sin(2\pi f_\Delta t)$). The frequency offset modulation generator 500 also includes a plurality of frequency multiplier circuits 502-506, each providing a different integer multiplier function to generate a corresponding output. For example, a first frequency multiplier circuit 502 provides a 2× multiplier function to generate a second output offset frequency tone ($\sin(2\pi f_\Delta t)$). In addition, a second frequency multiplier circuit 503 provides a 3× multiplier function to generate a third output offset frequency tone ($\sin(2\pi 3f_\Delta t)$), a third frequency multiplier circuit 504 provides a 4× multiplier function to generate a third output offset frequency tone ($\sin(2\pi 4f_\Delta t)$), and so on, with the a (N−1)th frequency multiplier circuit 505 providing an (N−1)× multiplier function to generate the (N−1)th output offset frequency tone ($\sin((N-1)\pi 2f_\Delta t)$). In selected embodiments, the frequency offset modulation generator 500 may also include an additional frequency multiplier 506 that provides a 2N multiplier function to the generate the sampling output offset frequency tone ($\sin(2\pi 2Nf_\Delta t)$) for driving the ADC in the receiver module if the sampling rate if $f_s = 2N\Delta f$. Note also that depending on the radar system requirements and also upon the actual performance of the low-pass filter 325 that directly precedes the ADC, the sample rate of the ADC may need to be increased beyond $f_s = 2N\Delta f$.

While the frequency offset tones can be generated from the fundamental offset frequency using a plurality of multipliers, it will be appreciated that other approaches for generating the offset frequencies may be used. For example, reference is now made to FIG. 6 which depicts a simplified schematic block diagram of frequency offset modulation generator 600 in accordance with a second selected embodiment of the present disclosure wherein the FOM tones are generated from the sampling frequency of the ADC LO at $f_s$ Hz. As depicted the frequency offset modulation generator 600 is connected to receive the ADC sampling frequency tone ($\sin(2\pi f_s t)$) as an input to a first frequency divider circuit 601 which divides the input frequency by a factor of 2N for output as a first output offset frequency tone ($\sin(2\pi f_\Delta t)$). The frequency offset modulation generator 600 also includes a plurality of frequency multiplier circuits 602-605, each providing a different integer multiplier function to generate a corresponding output. For example, a first frequency multiplier circuit 602 provides a 2× multiplier function to the output from the first frequency divider circuit 601, thereby generating a second output offset frequency tone ($\sin(2\pi f_\Delta t)$). In addition, a second frequency multiplier circuit 603 provides a 3× multiplier function to the output from the first frequency divider circuit 601, thereby generating a third output offset frequency tone ($\sin(2\pi 3f_\Delta t)$), and a third frequency multiplier circuit 604 provides a 4× multiplier function to the output from the first frequency divider circuit 601, thereby generating a third output offset frequency tone ($\sin(2\pi 4f_\Delta t)$), and so on, with the a (N−1)th frequency multiplier circuit 605 providing an (N−1)× multiplier function to generate the (N−1)th output offset frequency tone ($\sin((N-1)\pi f_\Delta t)$).

Figure 7:
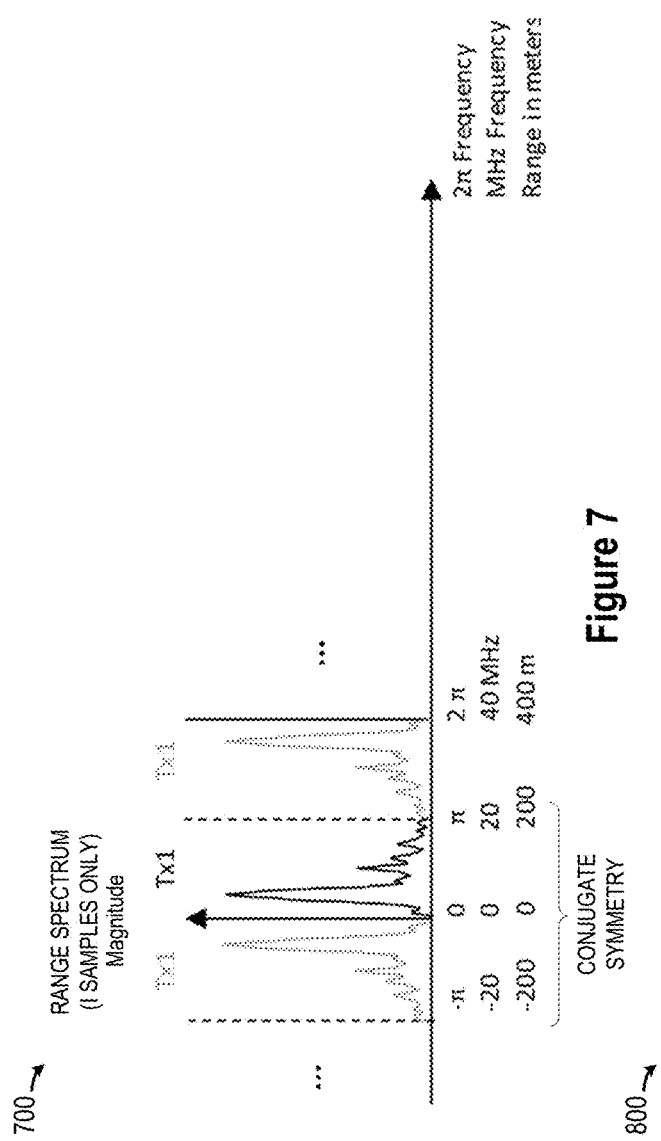
FIG. 7 depicts a fast-time range FFT spectrum of an I-sample only receiver channel of a conventional LFM automotive radar.

For a contextual understanding of the design and arrangement of a range-divided transmitter signal spectrum produced by a frequency offset modulation LFM range division MIMO automotive radar system, reference is now made to FIG. 7 which depicts an example fast-time range FFT spectrum 700 of an I-sample only receiver channel of a conventional LFM automotive radar having a designed $2\pi$ range of 400 m which corresponds to a $2\pi$ IF frequency of 40 MHz. In the example, the potential range spectrum 700 of such a radar is generated from a single transmit antenna Tx1 by sampling only the real part (I samples) of the mixer output at the receiver for use in producing the spectrum. Given real samples only, it can be seen that the spectrum is conjugate symmetric around the zero frequency, in which case the usable range extent is between 0 and 200 m, and the maximum unambiguous range of this radar is designed to be 200 m. It will also be appreciated that any simultaneous transmission from multiple transmit antennas of the same of LFM waveforms will result in overlapping signals in the same range FFT spectrum segment, making it impossible to extract individual transmit channel information. While this information extraction problem can be addressed by temporally separating the LFM waveform transmissions from each transmit antenna, such a time-division scheme by itself has the performance limitations and drawbacks noted hereinabove.

Figure 8:
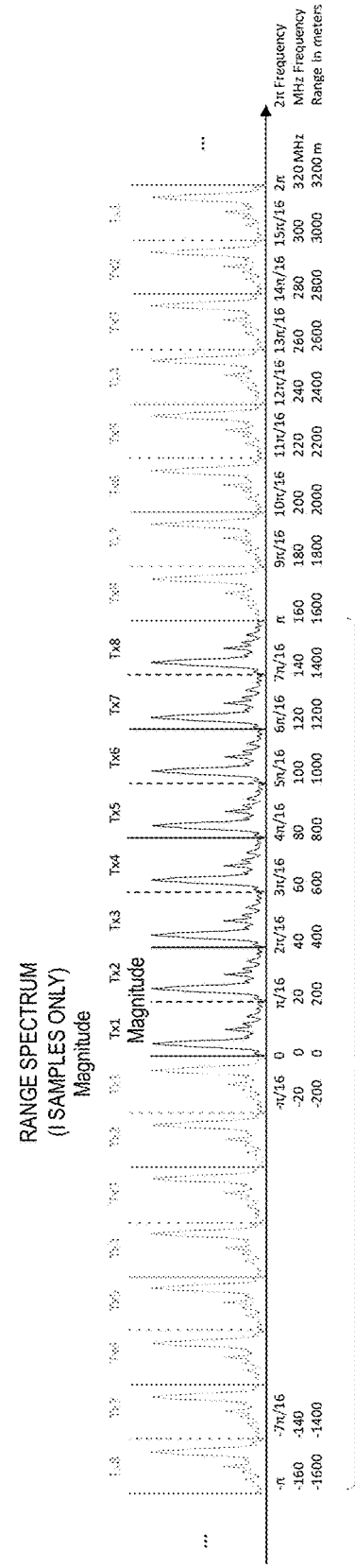
FIG. 8 depicts a fast-time range FFT spectrum of a receiver channel of an I-sample only for an 8-transmitter frequency offset modulated LFM range-division MIMO automotive radar in accordance with selected embodiments of the present disclosure.

To address these limitations and others known to those skilled in the art, there is disclosed herein a frequency offset modulation (FOM) approach for use with LFM automotive radar systems to separate individual transmit channel information within the fast-time range FFT spectrum at the receiver by having the transmitter mix a unique frequency offset signal with the chirp signal of each transmit channel. To illustrate the resulting transmit signal spectrum, reference is now made to FIG. 8 which depicts a fast-time range FFT spectrum 800 of a receiver channel of an I-sample only mixer which receives an 8-transmitter frequency offset modulated LFM range-division MIMO automotive radar in accordance with selected embodiments of the present disclosure. Based on the waveform configuration shown in FIG. 7, the application of frequency offset modulation to support 8 transmitters for RD-MIMO will require that the sampling rate be increased to at least 320 MHz so that each transmitter occupies a portion of the spectrum without overlapping each other. As depicted with the darker lines, the transmitter channels Tx1-Tx8 occupy consecutive 20 MHz spectrum segments between 0 and 160 MHz, and as indicated with the gray lines, the rest of the spectrum 800 is conjugate symmetrically redundant due to the use of real sample only data. In this case, the offset frequency $f_A$ between two adjacent transmitters is 20 MHz. Again, the use of only real samples means that the spectrum is conjugate symmetric around the zero frequency, and the usable range extent for each transmitter Tx1-Tx8 is between 0 and 200 m, with each transmitter's range extent being shifted or offset from one another in the range FFT spectrum 800 (e.g., 0 m≤Tx1<200 m, 200 m≤Tx2<400 m, 400 m≤Tx3<600 m, etc.). Based on the range-spectrum division arrangement whereby individual transmitters occupy distinct portions of the spectrum 800, the fast-time samples associated with distinct transmitters may be recovered at the receiver module for subsequent processing to construct the MIMO virtual array.

Figure 9:
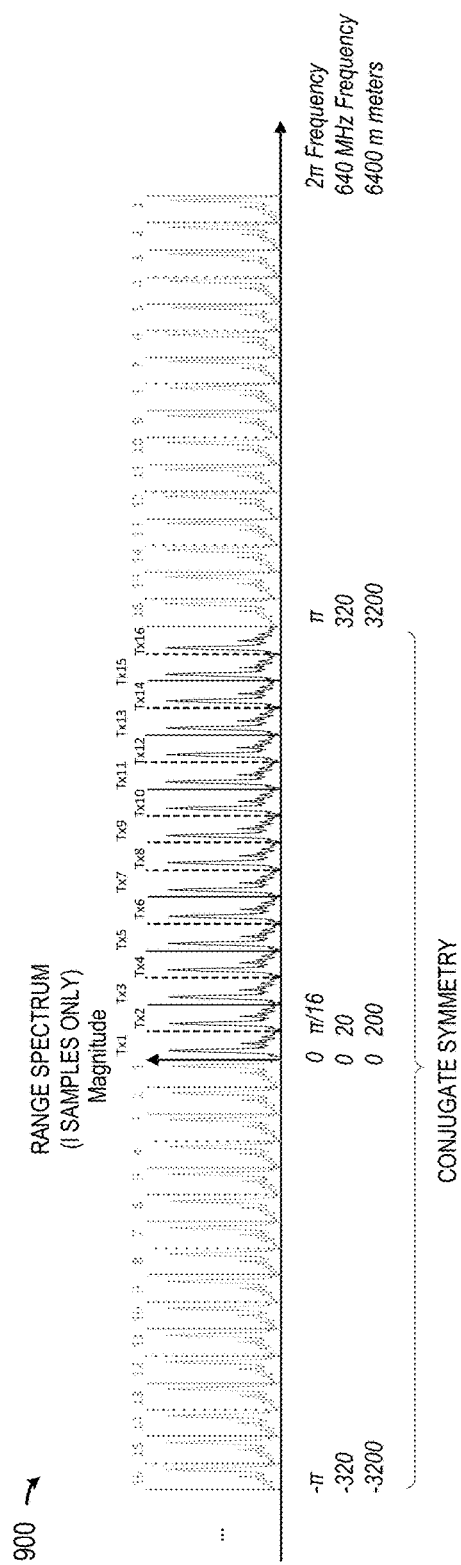
FIG. 9 depicts a fast-time range FFT spectrum of a receiver channel of an I-sample only for a 16-transmitter frequency offset modulated LFM range-division MIMO automotive radar in accordance with selected embodiments of the present disclosure.

To provide another example transmitter signal spectrum for an LFM range division MIMO automotive radar system, reference is now made to FIG. 9 which depicts a fast-time range FFT spectrum 900 of a receiver channel of an I-sample only for a 16-transmitter frequency offset modulated LFM range-division MIMO automotive radar in accordance with selected embodiments of the present disclosure. Assuming the same waveform configuration as before, the ADC sampling rate must be increased to at least 640 MHz so that each transmitter occupies at least 20 MHz of the spectrum without overlapping each other. Note also that depending on the radar system requirements and also upon the actual performance of the low-pass filter 325 that directly precedes the ADC, the sample rate of the ADC may need to be increased beyond $f_s=2N\Delta f$. As depicted with the darker lines, the transmitter channels Tx1-Tx16 occupy consecutive 20 MHz spectrum segments between 0 and 320 MHz, and as indicated with the gray lines, the rest of the spectrum 900 is conjugate symmetrically redundant due to the use of real sample only data.

Figure 10:
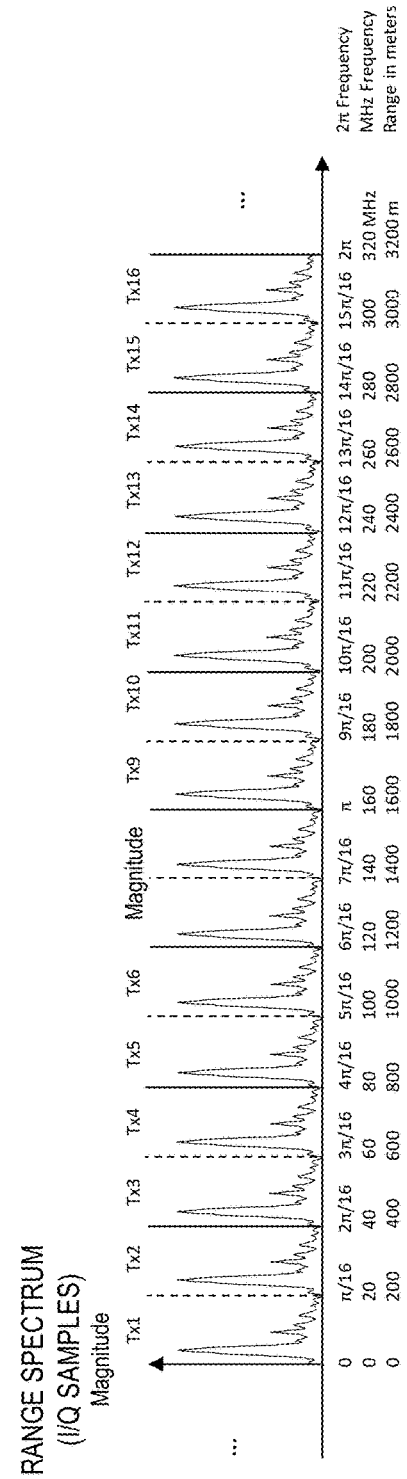
FIG. 10 depicts a fast-time range FFT spectrum of a receiver channel of an I/Q sample for a 16-transmitter frequency offset modulated LFM range-division MIMO automotive radar in accordance with selected embodiments of the present disclosure.

As will be appreciated, other sampling arrangements can be implemented with FOM LFM RD-MIMO automotive radar systems to provide a fast-time range division FFT spectrum. For example, both the real and imaginary (I and Q) samples may be used for producing the spectrum. To provide an example of transmitter signal spectrum generated from I and Q samples, reference is now made to FIG. 10 which depicts a fast-time range FFT spectrum 1000 of a receiver channel of an I/Q sample for a 16-transmitter frequency offset modulated LFM range-division MIMO automotive radar in accordance with selected embodiments of the present disclosure. By virtue of using both I and Q samples, the sampling rate of each of the I and Q channel ADCs can be reduced to 320 MHz while still allowing the 16 transmitters to fit within the 320 MHz swath of spectrum while maintaining at least 20 MHz of the spectrum for each transmitter without overlapping each other. In particular, the transmitter channels Tx1-Tx16 occupy consecutive 20 MHz spectrum segments between 0 and 320 MHz. However, this arrangement requires balanced I/Q mixers and two ADCs (one for I samples and one for Q samples) which may be costlier than the I-sample only implementation for achieving similar performance.

Figure 11:
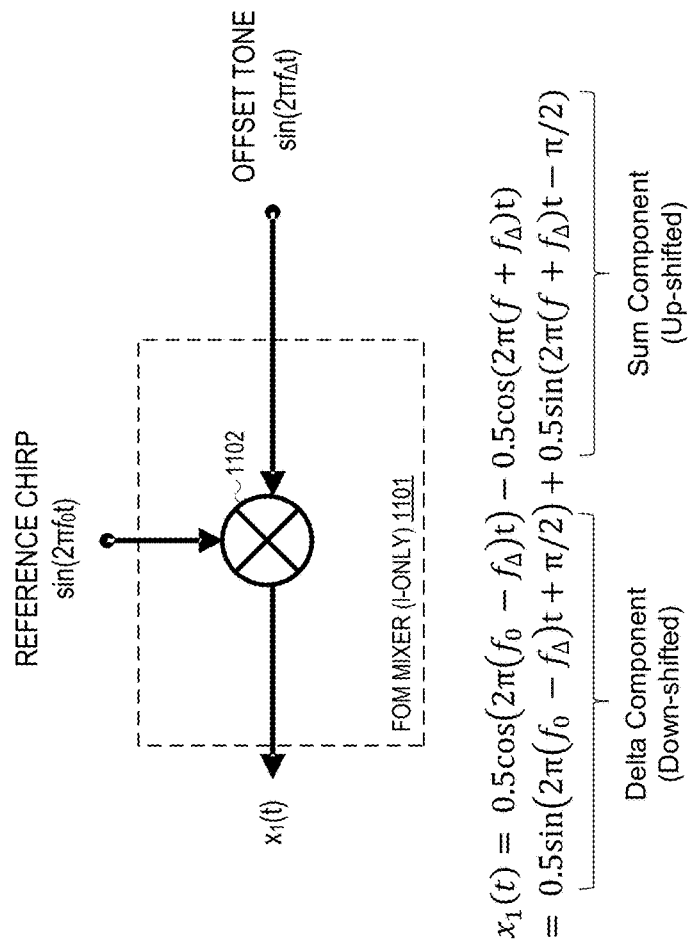
FIG. 11 is a simplified diagram of an I-branch only frequency offset modulation mixer in accordance with selected embodiments of the present disclosure.

While selected embodiments of the FOM MIMO scheme are described with reference to using I/Q modulation mixers to combine offset frequency signals ($f_t$, $2f_t$, $3f_t$, etc.) with the reference chirp signal, it will be appreciated that some I/Q modulators impose significant hardware costs and complexity, such as the requirement for implementing phase shifters and/or for avoiding unbalanced I/Q mixing that can arise when there is misalignment between the amplitude and phase of the I and Q channels. To provide additional details for an improved understanding of selected single channel modulation mixer embodiments of the present disclosure, reference is now made to FIG. 11 which depicts a simplified diagram of an I-branch only frequency offset modulation mixer 1100 which shifts the carrier frequency of the reference chirp signal $\sin(2\pi f_0 t)$ by the offset tone signal $\sin(2\pi f_A t)$ which are both input to the I-channel only FOM mixer 1101. In this example, the frequency $f_0$ represents the chirp signal's instantaneous frequency, and the frequency $f_A$ represents a constant offset frequency. As indicated by the single mixer symbol, the FOM mixer 1101 is a single channel (e.g., I-channel only) mixer for mixing the LFM waveform of the reference chirp signal carrier $\sin(2\pi f_0 t)$) with a fixed frequency of the offset tone ($\sin(2\pi f_A t)$). As will be appreciated, the same operative principles may be used to implement a Q-branch only frequency offset modulation mixer (not shown) for shifting the carrier frequency of the reference chirp signal $\sin(2\pi f_0 t)$ by the offset tone signal $\sin(2\pi f_A t)$.

In the depicted example of an I-channel only FOM mixer 1101, the reference chirp input signal carrier ($\sin(2\pi f_0 t)$) is provided as an I-channel for mixing with the I component of the offset tone ($\sin(2\pi f_A t)$) at the I-channel only mixer 1102 to produce the mixer output $x_1(t)$ which includes a first down-shifted delta component (e.g., $0.5(\cos(2\pi(f_0-f_\Delta)t))$ and a second up-shifted sum component (e.g., $-0.5(\cos(2\pi(f_0+f_\Delta)t))$. To demonstrate that the sum of the two components is the frequency-offset modulated chirp signal, the following derivation of the mixer output $x_1(t)$ may be established based upon established trigonometric identities:

$$x_1(t) = 0.5\cos(2\pi(f_0 - f_\Delta)t) - 0.5\cos(2\pi(f_0 + f_\Delta)t)$$
$$= 0.5\sin(2\pi(f_0 - f_\Delta)t + \pi/2) + 0.5\sin(2\pi(f_0 + f_\Delta)t - \pi/2).$$

With this derivation, it is seen that the I-channel only mixer output $x_1(t)$ includes a first down-shifted delta component (e.g., $0.5(\sin(2\pi(f_0-f_\Delta)t+\pi/2))$ and a second up-shifted sum component (e.g., $0.5\sin(2\pi(f_0+f_\Delta)t-\pi/2))$. The sum component shifts the range spectrum of a transmitter by the amount of offset frequency to the positive range direction. The delta component shifts the range spectrum of a transmitter by the amount of offset frequency to the negative range direction.

As will be appreciated, the mixer output $x_1(t)$ value when the frequency offset $f_\Delta=0$ will depend on the configuration of the frequency offset generator (e.g., FIG. 3A, 306A or FIG. 3B, 306B) and the FOM mixers in the transmit modules (e.g., FIG. 3A, 310A or FIG. 3B, 310B). For example, with the transmit module configuration shown in FIG. 3A where the first transmit channel 311, 312 has no mixer, the mixer output $x_1(t)=\sin(2\pi f_0 t)$, which is out-of-phase with the other channel's up-shifted sum component by $\pi/2$ and therefore requires proper handling at the receiver. In contrast, with the transmit module configuration shown in FIG. 3B where the each transmit channel includes a mixer, the mixer output $x_1(t)=0$ when the frequency offset $f_\Delta=0$.

In this simplified FOM transmit mixer implementation 1101, circuit complexity is reduced by eliminating the Q channel processing circuits and phase shifters, such as the phase shifters 452, 454 and summing circuits 456 shown in FIG. 4B. In addition to reducing the required hardware, the I-branch only FOM mixer 1101 eliminates the magnitude and phase mismatch problem that can arise from unbalanced I/Q mixing (that is, misaligned amplitude and phase between I and Q channels). However, a drawback with such single-channel mixer is that the mixer output signal $x_1(t)$ contains an undesirable down-shifted delta component which has to be properly handled at the receiver.

Figure 12A:
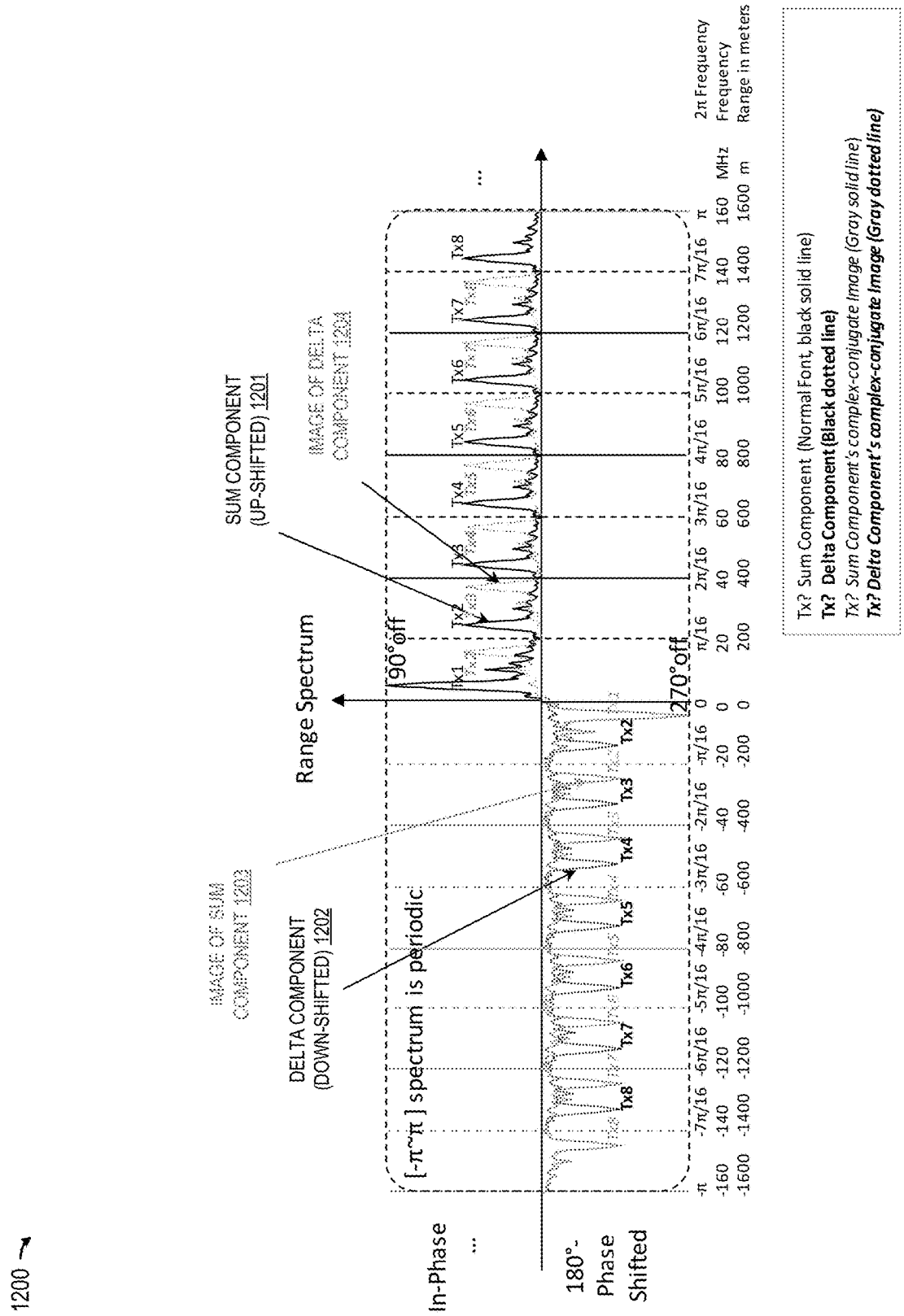
FIG. 12A depicts a fast-time range FFT spectrum of a frequency offset modulation LFM range division MIMO automotive radar system such as shown in FIG. 3A which uses I-branch only FOM mixers with insufficient frequency offset in combination with I-channel only analog-to-digital converter in the receiver.

To illustrate this issue, reference is now made to FIG. 12A which depicts a fast-time range FFT spectrum 1200 of a frequency offset modulation LFM range division MIMO automotive radar system such as shown in FIG. 3A which uses I-branch only FOM mixers with insufficient frequency offset in combination with I-channel only analog-to-digital converter in the receiver. In this example, the transmitter uses I-channel only FOM mixers connected to all but the first transmit channel circuit to provide integer multiples of a frequency offset $f_\Delta=20$ Mhz to generate transmit channel offsets at 0 MHz, 20 MHz, 40 MHz, 60 MHz, 80 MHz, 100 MHz, 120 MHz, and 140 MHz. At the receiver, the I-channel only ADC having a sampling rate of 320 MHz creates, for each transmitter (Txi), a sum component 1201 (shown with the black solid line and normal font), a delta component 1202 (shown with the black dotted line and bold-faced font), a sum component's complex-conjugate image 1203 (shown with the gray solid line and italic font), and a delta component's complex-conjugate image 1204 (shown with the gray dotted line and bold-faced italic font). In an example scenario where a 20 MHz IF spectrum is assumed to be sufficient to cover the maximum range, the I-only FOM mixing results in the delta components whose spectral image aliases with the sum component, causing significant interference. In particular, this is illustrated with the images of the delta component 1204 (shown with gray dotted line) for each transmitter (e.g., Tx2) which alias into the designated range spectrum for detecting the sum component 1201 (shown with black solid line) of a different transmitter (e.g., Tx1), thereby causing severe ambiguity in terms of what is being detected in the range spectrum segments for each transmit channel. In addition, the downshifted delta component 1202 (shown with black dotted line) for each transmitter (e.g., Tx2) aliases into the image of the sum component 1203 (shown with gray solid line) of a different transmitter (e.g., Tx1), thereby impairing correct detection. This happens when the transmit channel offset is no greater than twice of the instrumented range spectrum extent of an individual transmitter's instrumented range-spectrum bandwidth.

Figure 3B:
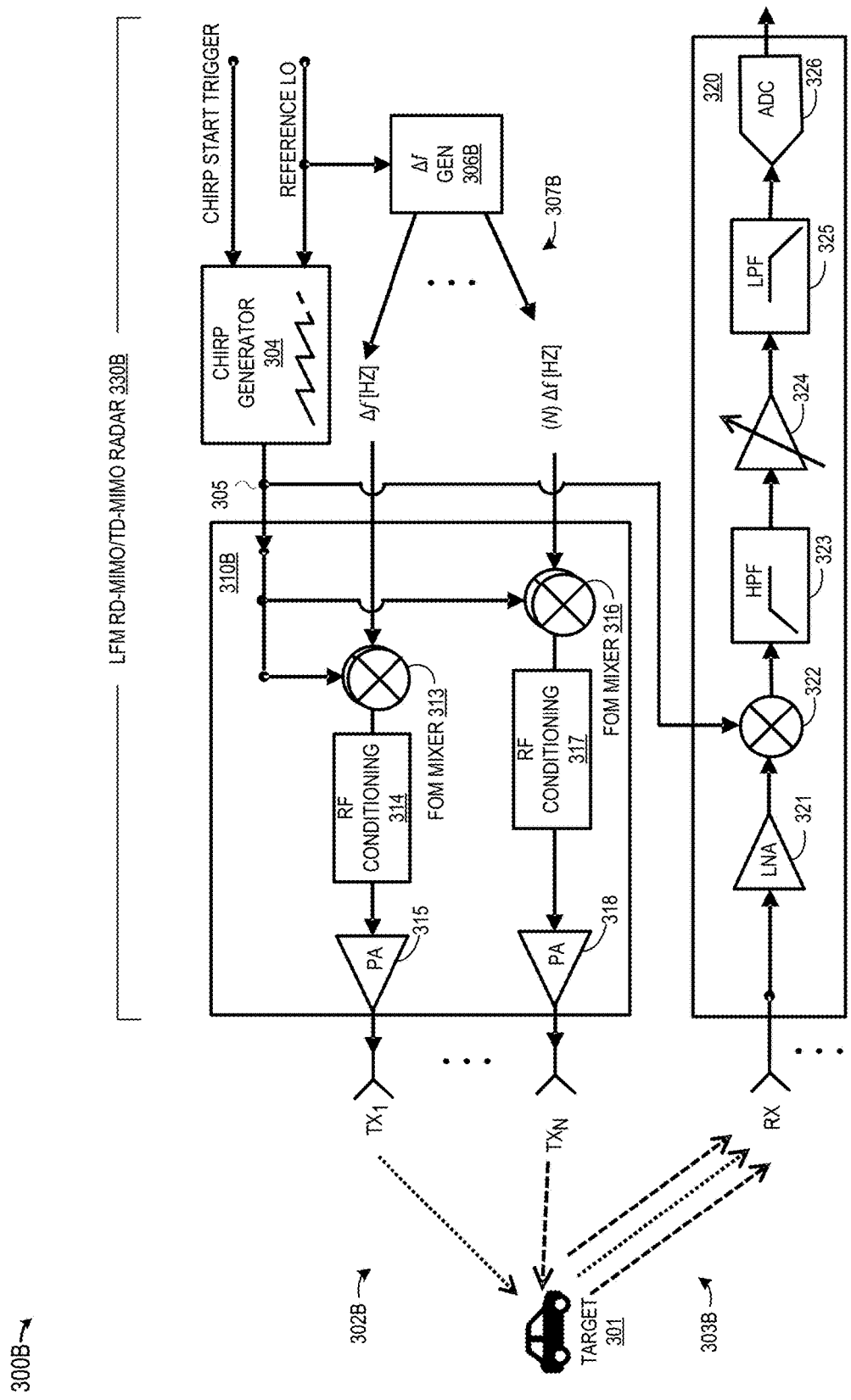
FIG. 3B is a simplified schematic block diagram of a frequency offset modulation LFM range division MIMO automotive radar system implemented with FOM modulation mixers in accordance with selected second embodiments of the present disclosure.
Figure 12B:
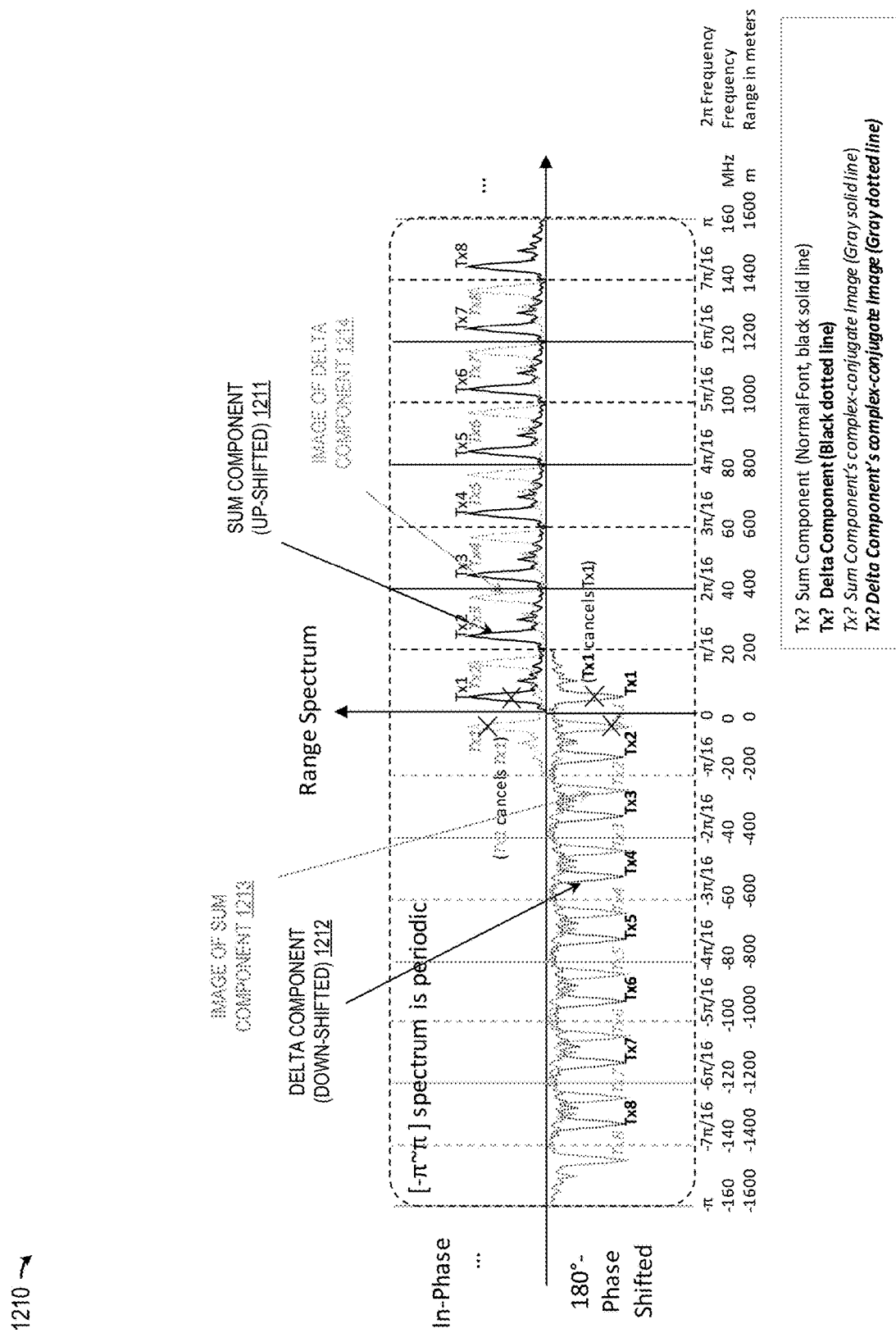
FIG. 12B depicts a fast-time range FFT spectrum of a frequency offset modulation LFM range division MIMO automotive radar system such as shown in FIG. 3B which uses I-branch only FOM mixers with insufficient frequency offset in combination with I-channel only analog-to-digital converter in the receiver.

To provide another illustration of this issue, reference is now made to FIG. 12B which depicts a fast-time range FFT spectrum 1210 of a frequency offset modulation LFM range division MIMO automotive radar system such as shown in FIG. 3B which uses I-branch only FOM mixers with insufficient frequency offset in combination with I-channel only analog-to-digital converter in the receiver. In this example, the transmitter uses I-channel only FOM mixers connected to each transmit channel circuit to provide integer multiples of a frequency offset $f_\Delta=20$ Mhz to generate transmit channel offsets at 0 MHz, 20 MHz, 40 MHz, 60 MHz, 80 MHz, 100 MHz, 120 MHz, and 140 MHz. At the receiver, the I-channel only ADC having a sampling rate of 320 MHz creates, for each transmitter (Txi), a sum component 1211 (shown with the black solid line and normal font), a delta component 1212 (shown with the dotted black line and bold-faced font), a sum component's complex-conjugate image 1213 (shown with the gray solid line and italic font), and a delta component's complex-conjugate image 1214 (shown with the gray dotted line and bold-faced italic font). As illustrated, the upshifted sum component from the first transmitter Tx1 is cancelled by the downshifted delta component from the first transmitter Tx1, and the image of the sum component from the first transmitter Tx1 cancels the image of the delta component from the first transmitter Tx1. In addition, the images of the delta component 1214 (shown with gray dotted line) for one transmitter (e.g., Tx2) alias into the designated range spectrum for detecting the sum component 1211 (shown with black solid line) for a different transmitter (e.g., Tx1), thereby causing severe ambiguity in terms of what is being detected in the range spectrum segments for each transmit channel. Likewise, the downshifted delta component 1212 (shown with black dotted line) for each transmitter (e.g., Tx2) aliases into the image of the sum component 1213 (shown with gray solid line) of a different transmitter (e.g., Tx1), thereby impairing correct detection. Again, this happens when the transmit channel offset is no greater than twice of the instrumented range spectrum extent of an individual transmitter's instrumented range-spectrum bandwidth.

To prevent spectrum aliasing interactions between the images of the delta component (e.g., 1204) of a first I-channel only mixer and an adjacent channel's sum component (e.g., 1201), the amount of offset frequency $f_\Delta$ should be doubled or increased by at least 100 percent, with a corresponding increase in the ADC sampling rate at the receiver module 320 in order to maintain number of supported transmitters. As a result of these adjustments to the amount of frequency offset and ADC sampling rate, the final range spectrum may be derived from the sum and delta components by means of coherently integrating the range spectrums. By at least doubling the offset frequency $f_A$, much of the aliasing effect is eliminated. With the up-shifted sum component and down-shifted delta component range spectrum both available, they can be combined to achieve better signal-to-noise ratio (SNR).

Figure 13A:
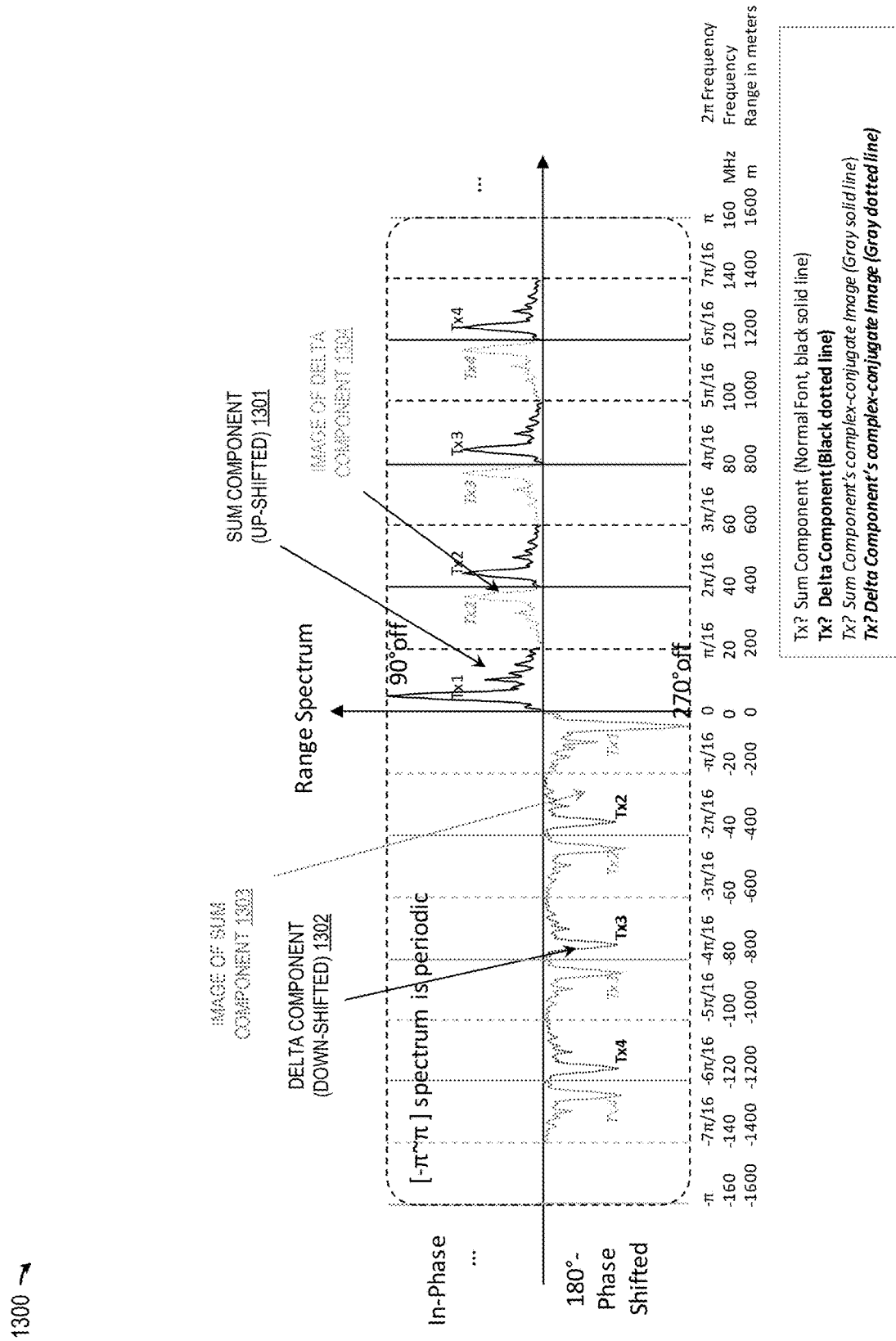
FIG. 13A depicts a fast-time range FFT spectrum of a frequency offset modulation LFM range division MIMO automotive radar system such as shown in FIG. 3A which uses I-branch only FOM mixer range spectrum with sufficient frequency offset in combination with I-channel only analog-to-digital converter in the receiver in accordance with selected embodiments of the present disclosure.

To illustrate a first example solution, reference is now made to FIG. 13A which depicts a fast-time range FFT spectrum 1300 of a frequency offset modulation LFM range division MIMO automotive radar system such as shown in FIG. 3A which uses I-branch only FOM mixer range spectrum with sufficient frequency offset in combination with I-channel only analog-to-digital converter in the receiver in accordance with selected embodiments of the present disclosure. In this first example solution, the transmitter uses I-channel only FOM mixers connected to all but the first transmit channel circuit to provide integer multiples of a frequency offset $f_A$=40 Mhz to generate transmit channel offsets at 0 MHz, 40 MHz, 80 MHz, and 120 MHz. At the receiver, the I-channel only ADC having a sampling rate of 320 MHz creates, for each transmitter (Txi), an upshifted sum component 1301 (shown with the black solid line and normal font), a downshifted delta component 1302 (shown with the dotted black line and bold-faced font), a sum component's complex-conjugate image 1303 (shown with the gray solid line and italic font), and a delta component's complex-conjugate image 1304 (shown with the gray dotted line and bold-faced italic font). As illustrated, the upshifted sum component 1301 for a first transmitter (e.g., from the first transmitter Tx1) has no interfering aliasing from the image of the delta component 1304 from an adjacent transmitter (e.g., from the second transmitter Tx2). In addition, there is no aliasing interference between images of the delta component 1302 (shown with black dotted line) for a first transmitter (e.g., a first transmitter Tx1) and the image of the sum component 1303 (shown with gray solid line) for an adjacent transmitter (e.g., a second transmitter Tx2). As a result, the sum and delta components of the first transmitter Tx1 are both available and can be combined in the first IF bandwidth segment (0-20 MHz) to achieve better SNR performance.

As illustrated with the first example solution shown in FIG. 13A, the ADC sampling rate of 320 MHz supports four transmitters, each consuming 40 MHz except for the first transmitter Tx1, which consumes only 20 MHz. Thus, the number of supported transmitters is halved in comparison to the example shown in FIG. 12A, given the same ADC sampling rate (namely 320 MHz). However, FIG. 13A shows that there is unused spectrum between 140 MHz and 160 MHz and −140 MHz and −160 MHz, indicating that the ADC rate may be reduced by 40 MHz to 280 MHz and still support 4 transmitters. Alternatively, the receiver module (e.g., 320) may be configured to support additional transmitters by increasing the ADC sampling rate by 80 MHz to fit each additional transmitter (in the given example). For example, to fit 8 transmitters, the ADC sampling rate should be increased to at least 600 MHz. Similarly, to support 16 transmitters, the ADC sampling rate must be at least 1240 MHz.

Figure 13B:
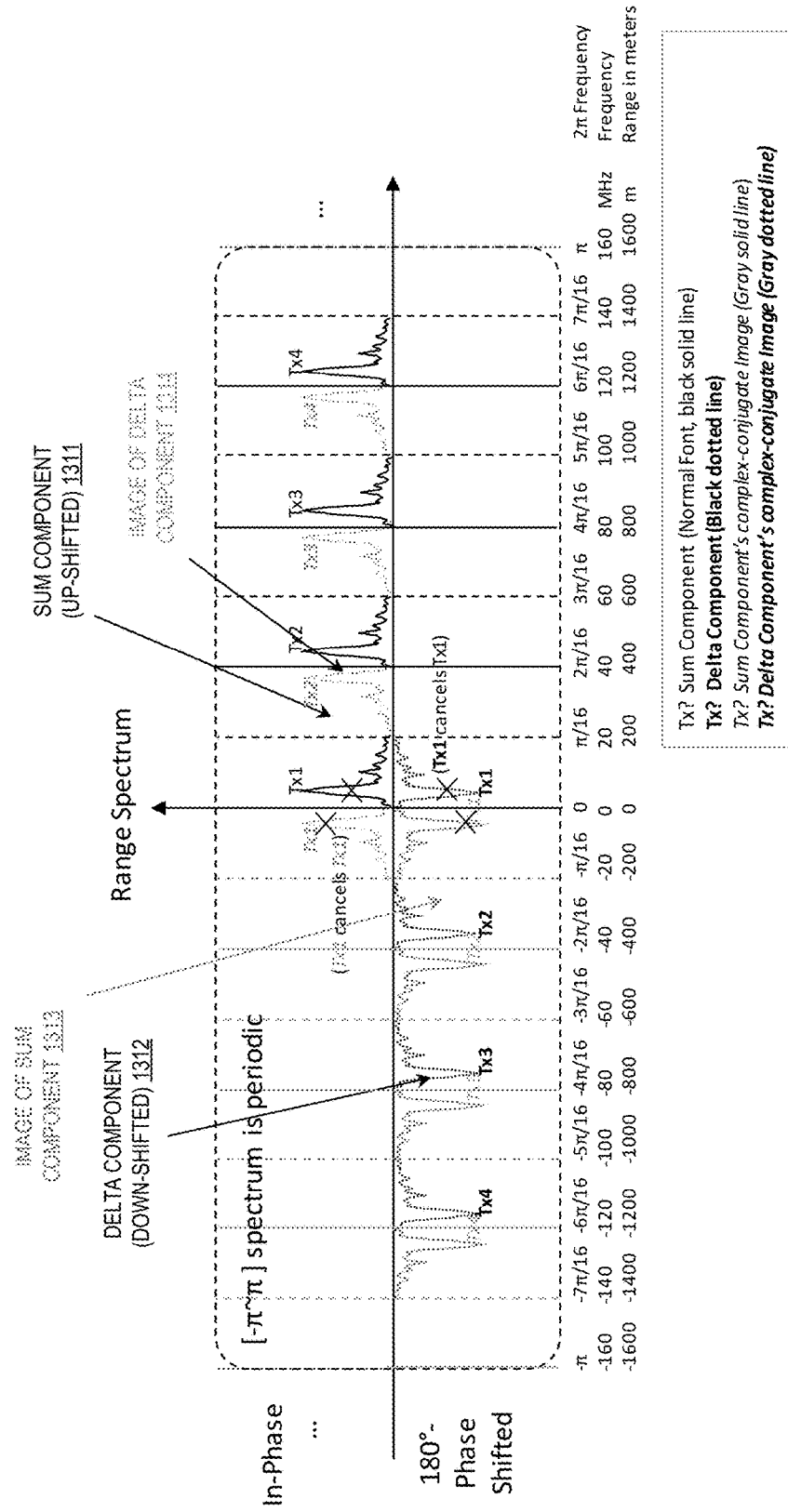
FIG. 13B depicts a fast-time range FFT spectrum of a frequency offset modulation LFM range division MIMO automotive radar system such as shown in FIG. 3B which uses I-branch only FOM mixer range spectrum with sufficient frequency offset in combination with I-channel only analog-to-digital converter in the receiver in accordance with selected embodiments of the present disclosure with the exception that additional offset is required to prevent cancellation of a first transmitter's signal.

To illustrate a second example solution, reference is now made to FIG. 13B which depicts a fast-time range FFT spectrum 1310 of a frequency offset modulation LFM range division MIMO automotive radar system such as shown in FIG. 3A which uses I-branch only FOM mixer range spectrum with sufficient frequency offset in combination with I-channel only analog-to-digital converter in the receiver in accordance with selected embodiments of the present disclosure. In this second example, the transmitter uses I-channel only FOM mixers connected to all transmit channel circuits to provide integer multiples of a frequency offset $f_A$=40 Mhz to generate transmit channel offsets at 0 MHz, 40 MHz, 80 MHz, and 120 MHz. At the receiver, the I-channel only ADC having a sampling rate of 320 MHz creates, for each transmitter (Txi), an upshifted sum component 1311 (shown with the black solid line and normal font), a downshifted delta component 1312 (shown with the dotted black line and bold-faced font), a sum component's complex-conjugate image 1313 (shown with the gray solid line and italic font), and a delta component's complex-conjugate image 1314 (shown with the gray dotted line and bold-faced italic font). As illustrated, if a frequency offset $f_A$ is not applied to the first transmitter, the upshifted sum component 1311 for the first transmitter Tx1 is cancelled by the image of the delta component 1314 for the first transmitter Tx1, and the image of the delta component 1314 for the first transmitter Tx1 is cancelled by the image of the sum component 1313 for the first transmitter Tx1. To avoid aliasing and cancellation of the signal from the first transmitter Tx1, the first transmitter Tx1 needs to be offset, but only by the regular amount which is at least the instrumented range spectrum extent of a transmitter.

Figure 13C:
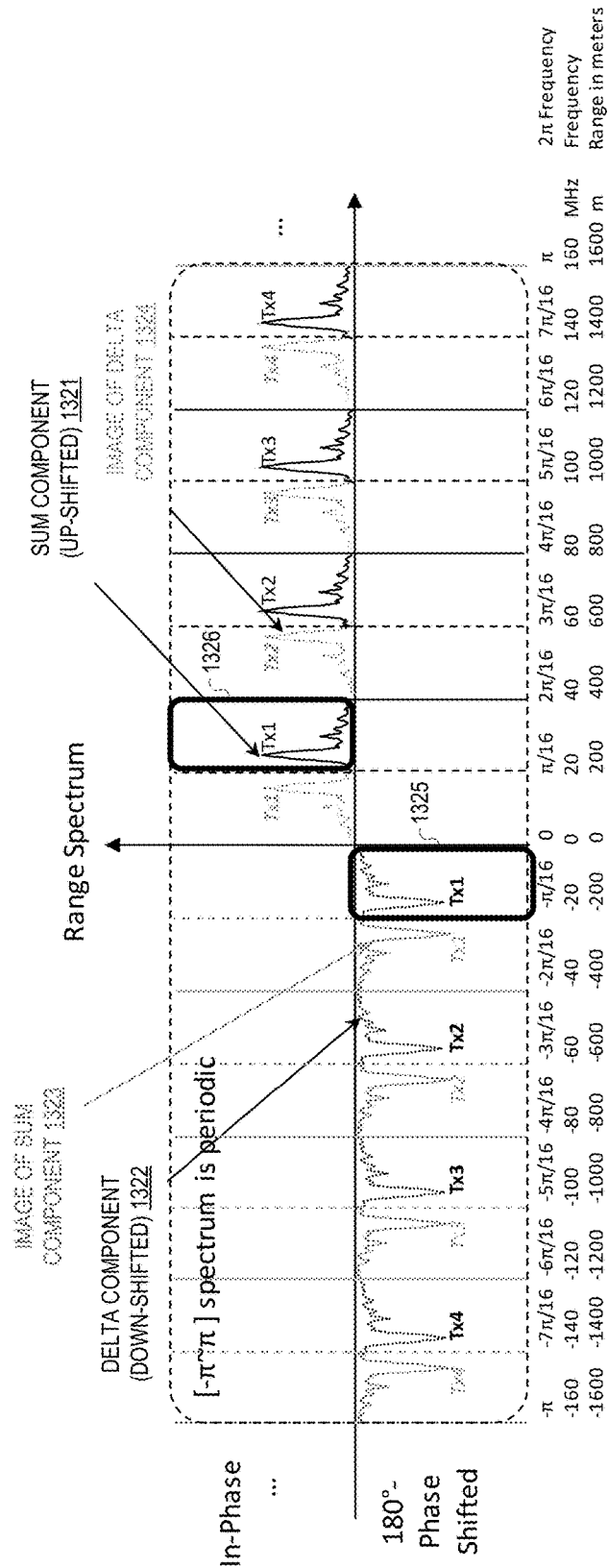
FIG. 13C depicts a fast-time range FFT spectrum of a frequency offset modulation LFM range division MIMO automotive radar system such as shown in FIG. 3B which uses I-branch only FOM mixer range spectrum with a first frequency offset for the first transmitter and a second, doubled frequency offset for the remaining transmitters in combination with I-channel only analog-to-digital converter in the receiver in accordance with selected embodiments of the present disclosure.

To illustrate an adjustment for avoiding cancellation of the first transmitter signal, reference is now made to FIG. 13C which depicts a fast-time range FFT spectrum 1320 of a frequency offset modulation LFM range division MIMO automotive radar system such as shown in FIG. 3B which uses I-branch only FOM mixer range spectrum with a first frequency offset for the first transmitter and a second, doubled frequency offset for the remaining transmitters in combination with I-channel only analog-to-digital converter in the receiver in accordance with selected embodiments of the present disclosure. In this example solution, the transmitter uses I-channel only FOM mixers connected to all transmit channel circuits to generate transmit channel offsets at 20 MHz, 60 MHz, 100 MHz, and 120 MHz. In this example, a first frequency offset (e.g., $f_A$=20 Mhz) is applied to the first transmitter which is at least the instrumented range spectrum extent of a transmitter, and a second frequency offset (e.g., $f_A$=40 Mhz) is applied to the remaining transmitters to avoid signal overlap and cancellation of the first transmitter Tx1. At the receiver, the I-channel only ADC having a sampling rate of 320 MHz creates, for each transmitter (Txi), an upshifted sum component 1321 (shown with the black solid line and normal font), a downshifted delta component 1322 (shown with the black red line and bold-faced font), a sum component's complex-conjugate image 1323 (shown with the gray solid line and italic font), and a delta component's complex-conjugate image 1324 (shown with the gray dotted line and bold-faced italic font). As illustrated, the "Tx1" delta component's target echo component 1325 is phase-shifted 180° from the "Tx1" sum component's target echo component 1321. In addition, the corresponding noise components for the first transmitter (e.g., image of the sum component for Tx1 and the image of the delta component for Tx1) are independent of one another. As a result, the delta component of Tx1 1322 may be phase-shifted by 180° and combined with the sum component of the Tx1 1321 to double the target echo component's amplitude, quadruple its power, thereby doubling the noise component's variance (power) and the SNR.

As will be appreciated, a similar improvement in the SNR gain can also be achieved by combining the images of the sum and delta components 1323, 1324. However, SNR gains cannot be achieved by combining a sum or delta component with its image because the noise values are not independent.

As illustrated with the example solution shown in FIG. 13C, the ADC sampling rate of 320 MHz supports four transmitters, which is half the number of transmitters from the example shown in FIG. 12B given the same ADC sampling rate (namely 320 MHz). However, the receiver module (e.g., 320) may be configured to support additional transmitters by increasing the ADC sampling rate by 80 MHz to fit each additional transmitter (in the given example). For example, to fit 8 transmitters, the ADC sampling rate should be increased to at least 600 MHz. Similarly, to support 16 transmitters, the ADC sampling rate must be at least 1240 MHz.

Figure 14A:
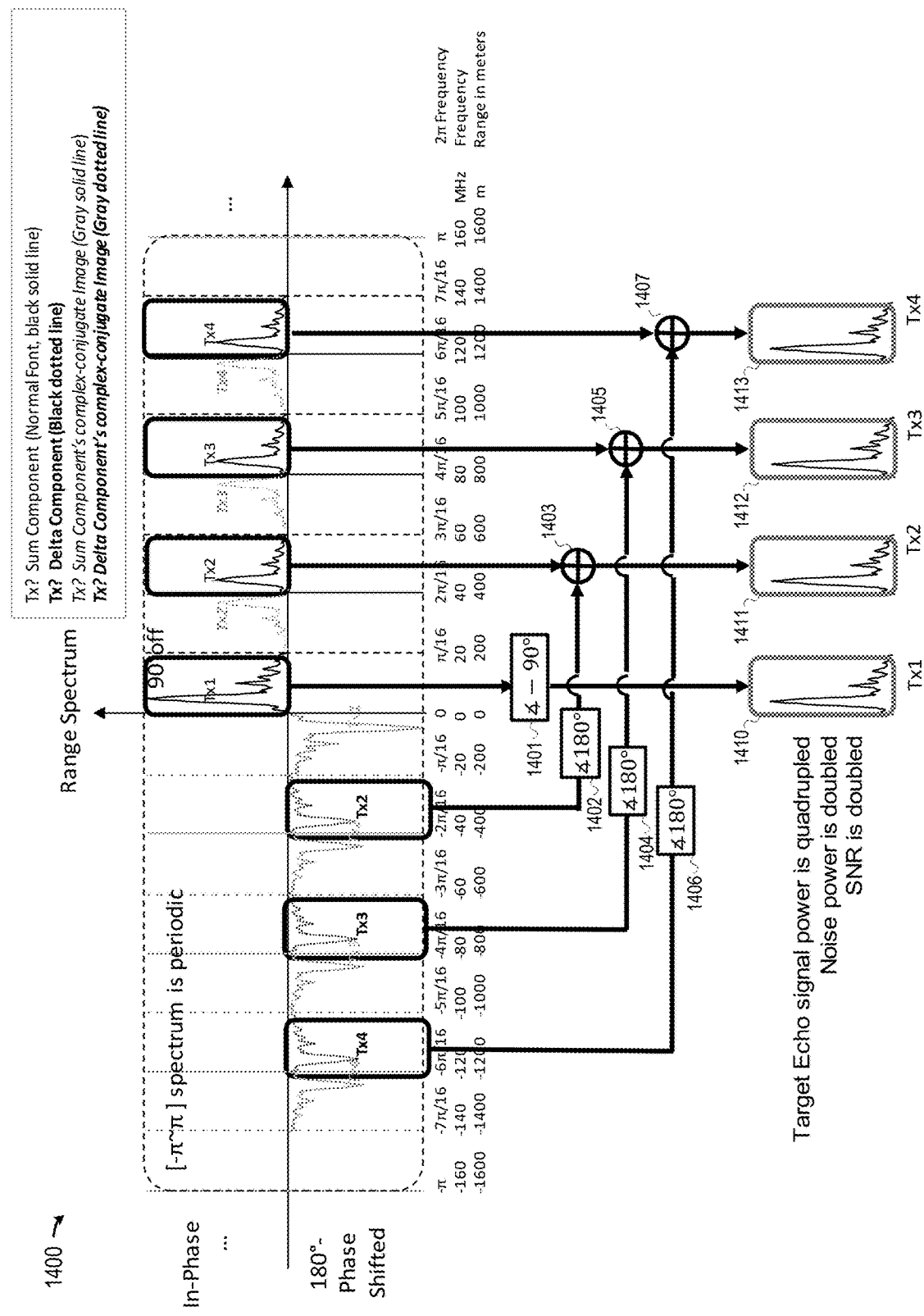
FIG. 14A diagrammatically depicts a coherent integration of the sum and delta components of the range spectrums of a frequency offset modulation LFM range division MIMO automotive radar system such as shown in FIG. 3A which uses I-branch only FOM mixers in combination with I-channel only analog-to-digital converter in the receiver in accordance with selected embodiments of the present disclosure.

To illustrate a first example solution for coherently integrating the sum and delta components, reference is now made to FIG. 14A which diagrammatically depicts a coherent integration of the sum and delta components in a fast-time range FFT spectrum 1400 of a frequency offset modulation LFM range division MIMO automotive radar system such as shown in FIG. 3A which uses I-branch only FOM mixer range spectrum with sufficient frequency offset in combination with I-channel only analog-to-digital converter in the receiver in accordance with selected embodiments of the present disclosure. In the depicted example solution, the transmitter uses I-channel only FOM mixers connected to all but the first transmit channel circuit to generate transmit channel offsets at 0 MHz, 40 MHz, 80 MHz, and 120 MHz. At the receiver, the I-channel only ADC having a sampling rate of 320 MHz creates, for each transmitter (Txi), an upshifted sum component (shown with the black solid line and normal font), a downshifted delta component (shown with the dotted black line and bold-faced font), a sum component's complex-conjugate image (shown with the gray solid line and italic font), and a delta component's complex-conjugate image (shown with the gray dotted line and bold-faced italic font). Since the I-only FOM mixers on transmit module divide the transmit power into the sum and delta components, the received signal power is also halved if only the sum or delta component is processed at the receiver (except for the first transmit channel). This is illustrated in FIG. 14A which shows that the transmitter's sum and delta spectral segments are separated by applying the appropriate frequency offset values to each transmitter channel.

Once the separation of transmitters and the sum and delta spectral segments are done, a final spectrum can be produced for each transmitter by using a combination of phase shifter and summing circuits 1401-1407 to coherently combine the sum and delta spectrums in the digital domain. In this example, it is noted that the first transmitter Tx1 does not undergo the FOM mixing, so it is ahead of the sum component outputs by 90 degrees in phase. As a result, a first phase shifter circuit 1401 applies a −90° phase shift to the first transmitter's spectrum to align all outputs (e.g., by multiplying with $e^{-j\pi/2}$) into an output Tx1 signal 1410. For the remaining transmitters, it is noted that the sum component for a given transmitter (e.g., Tx2) lags the corresponding delta component by a phase shift of 180°, so coherent combination is implemented simply by reversing the sign of the delta component before summing the two extracted spectrum segments. For example, a second phase shifter circuit 1402 applies a 180° phase shift to the second transmitter's delta component for combination with the second transmitter's sum component at the summing circuit 1403 to generate a coherently combined output Tx2 signal 1411. In addition, a third phase shifter circuit 1404 applies a 180° phase shift to the third transmitter's delta component for combination with the third transmitter's sum component at the summing circuit 1405 to generate a coherently combined output Tx3 signal 1412. And finally, a fourth phase shifter circuit 1406 applies a 180° phase shift to the fourth transmitter's delta component for combination with the fourth transmitter's sum component at the summing circuit 1407 to generate a coherently combined output Tx4 signal 1413. As a result, the coherently combined delta and sum components for the transmitters 1410-1413 result in a quadrupled target echo signal power, a doubled noise power, and a doubled SNR.

As illustrated with the example solution shown in FIG. 14A, the ADC sampling rate of 320 MHz supports four transmitters. Thus, the number of supported transmitters is halved in comparison to the example shown in FIG. 12A, given the same ADC sampling rate (namely 320 MHz). However, FIG. 14A shows that there is unused spectrum between 140 MHz and 160 MHz and between −140 MHz and −160 MHz, indicating that the ADC rate may be reduced by 40 MHz to 280 MHz and still support 4 transmitters. Alternatively, the receiver module may be configured to support additional transmitters by increasing the ADC sampling rate to fit each additional transmitter.

Figure 14B:
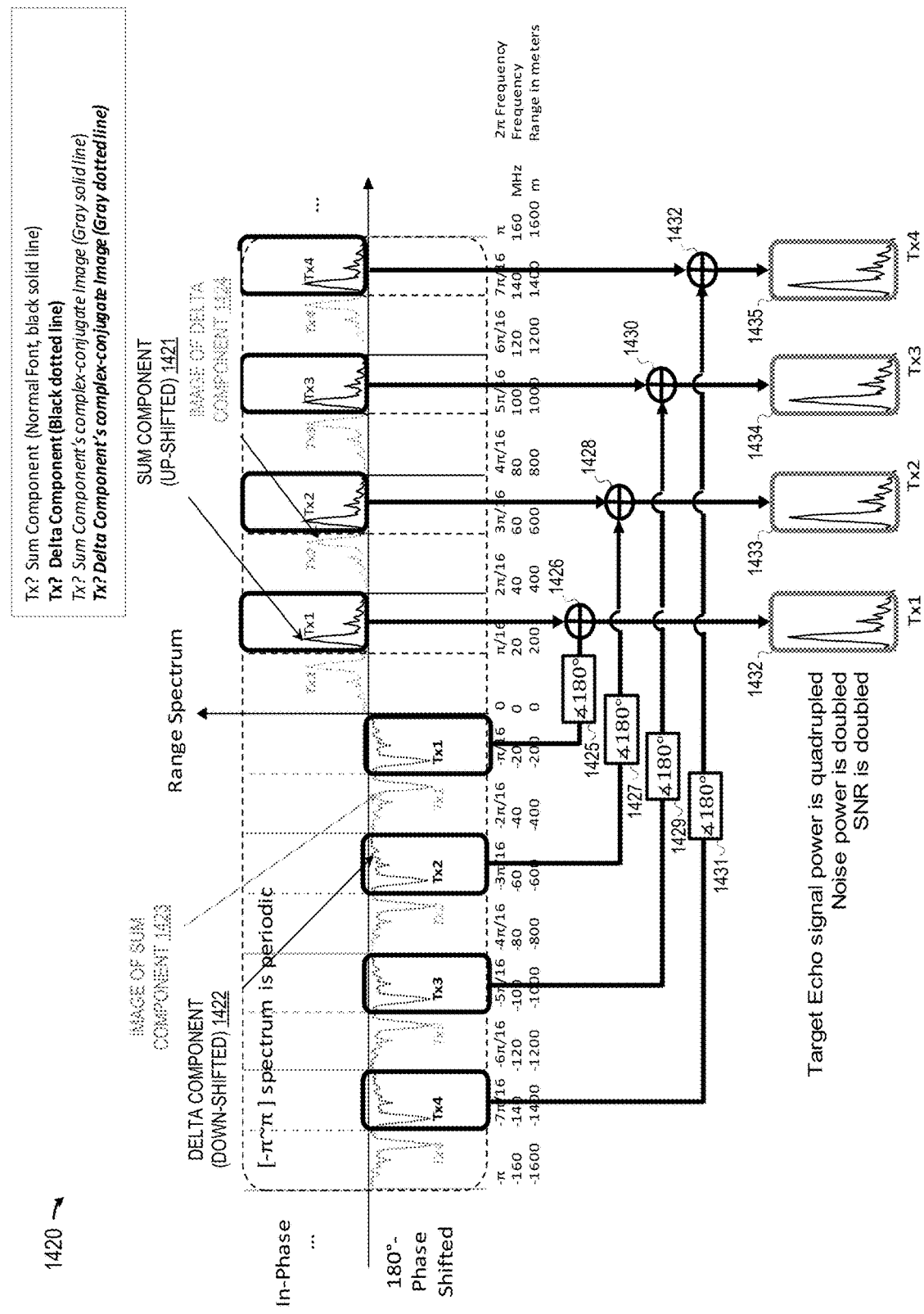
FIG. 14B diagrammatically depicts a coherent integration of the sum and delta components of the range spectrums of a frequency offset modulation LFM range division MIMO automotive radar system such as shown in FIG. 3B which uses I-branch only FOM mixers in combination with I-channel only analog-to-digital converter in the receiver in accordance with selected embodiments of the present disclosure.

To illustrate a second example solution for coherently integrating the sum and delta components, reference is now made to FIG. 14B which diagrammatically depicts a coherent integration of the sum and delta components in a fast-time range FFT spectrum 1420 of a frequency offset modulation LFM range division MIMO automotive radar system such as shown in FIG. 3B which uses I-branch only FOM mixer range spectrum with sufficient frequency offset in combination with I-channel only analog-to-digital converter in the receiver in accordance with selected embodiments of the present disclosure. In the depicted solution, the transmitter uses I-channel only FOM mixers connected to all transmit channel circuits to generate transmit channel offsets at 20 MHz, 60 MHz, 100 MHz, and 140 MHz. At the receiver, the I-channel only ADC having a sampling rate of 320 MHz creates, for each transmitter (Txi), an upshifted sum component 1421 (shown with the black solid line and normal font), a downshifted delta component 1422 (shown with the dotted black line and bold-faced font), a sum component's complex-conjugate image 1423 (shown with the gray solid line and italic font), and a delta component's complex-conjugate image 1424 (shown with the gray dotted line and bold-faced italic font). Since the I-only FOM mixers on transmit module divide the transmit power into the sum and delta components, the received signal power is also halved if only the sum or delta component is processed at the receiver. This is illustrated in FIG. 14B which shows that the transmitter's the sum and delta spectral segments are separated by applying the appropriate frequency offset values to each transmitter channel.

Once the separation of transmitters and the sum and delta spectral segments are done, a final spectrum can be produced for each transmitter by using a combination of phase shifter and summing circuits 1425-1432 to coherently combine the sum and delta spectrums in the digital domain. In this example, each of the transmitters generates a sum component that lags the corresponding delta component by a phase shift of 180°, so coherent combination is implemented simply by reversing the sign of the delta component before summing the two extracted spectrum segments. For example, a first phase shifter circuit 1425 applies a 180° phase shift to the first transmitter's delta component for combination with the first transmitter's sum component at the summing circuit 1426 to generate a coherently combined output Tx2 signal 1432. In addition, a second phase shifter circuit 1427 applies a 180° phase shift to the second transmitter's delta component for combination with the second transmitter's sum component at the summing circuit 1428 to generate a coherently combined output Tx2 signal 1433. In addition, a third phase shifter circuit 1429 applies a 180° phase shift to the third transmitter's delta component for combination with the third transmitter's sum component at the summing circuit 1430 to generate a coherently combined output Tx3 signal 1434. And finally, a fourth phase shifter circuit 1431 applies a 180° phase shift to the fourth transmitter's delta component for combination with the fourth transmitter's sum component at the summing circuit 1432 to generate a coherently combined output Tx4 signal 1435. As a result, the coherently combined delta and sum components for the transmitters 1432-1435 result in a quadrupled target echo signal power, a doubled noise power, and a doubled SNR.

As illustrated with the example solution shown in FIG. 14B, the ADC sampling rate of 320 MHz supports four transmitters. Thus, the number of supported transmitters is halved in comparison to the example shown in FIG. 12B, given the same ADC sampling rate (namely 320 MHz). However, the receiver module may be configured to support additional transmitters by increasing the ADC sampling rate to fit each additional transmitter.

Figure 15:
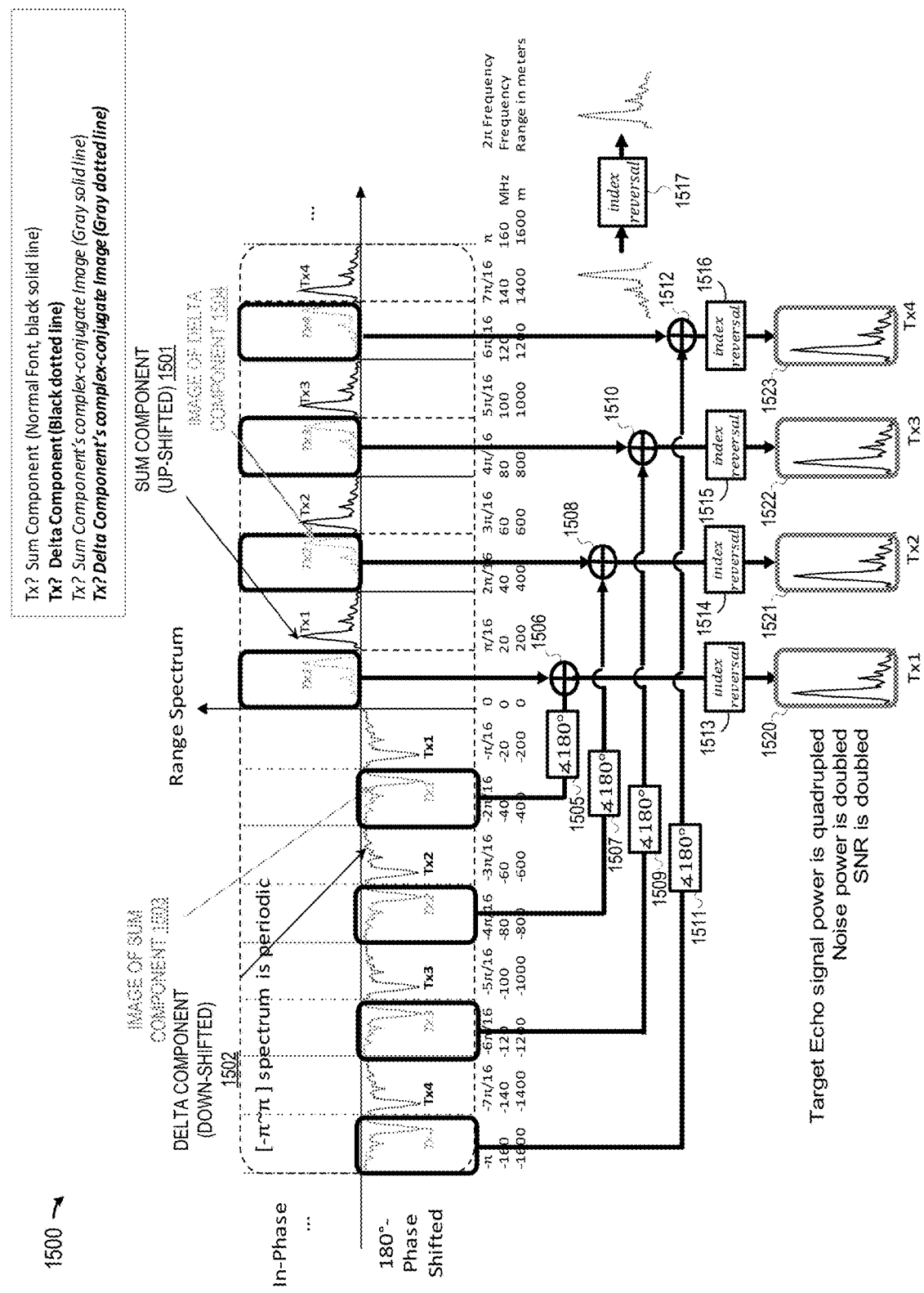
FIG. 15 diagrammatically depicts a coherent integration of the sum and delta components of the range spectrums of a frequency offset modulation LFM range division MIMO automotive radar system such as shown in FIG. 3B which uses I-branch only FOM mixers in combination with I-channel only analog-to-digital converter in the receiver in accordance with selected embodiments of the present disclosure.

To illustrate a third example solution for coherently integrating the sum and delta image components, reference is now made to FIG. 15 which diagrammatically depicts a coherent integration of the sum and delta image components in a fast-time range FFT spectrum 1500 of a frequency offset modulation LFM range division MIMO automotive radar system such as shown in FIG. 3B which uses I-branch only FOM mixer range spectrum with sufficient frequency offset in combination with I-channel only analog-to-digital converter in the receiver in accordance with selected embodiments of the present disclosure. In the depicted solution, the transmitter uses I-channel only FOM mixers connected to all transmit channel circuits to generate transmit channel offsets at 20 MHz, 60 MHz, 100 MHz, and 140 MHz. At the receiver, the I-channel only ADC having a sampling rate of 320 MHz creates, for each transmitter (Txi), an upshifted sum component 1501 (shown with the black solid line and normal font), a downshifted delta component 1502 (shown with the dotted black line and bold-faced font), a sum component's complex-conjugate image 1503 (shown with the gray solid line and italic font), and a delta component's complex-conjugate image 1504 (shown with the gray dotted line and bold-faced italic font). Since the I-only FOM mixers on transmit module divide the transmit power into the sum and delta components, the received signal power is also halved if only the sum or delta component is processed at the receiver. This is illustrated in FIG. 15 which shows that the transmitter's the sum and delta spectral segments are separated by applying the appropriate frequency offset values to each transmitter channel.

Once the separation of transmitters and the sum and delta image spectral segments are done, a final spectrum can be produced for each transmitter by using a combination of phase shifter, summing, and index reversal circuits 1505-1516 to coherently combine the sum and delta image spectrums in the digital domain. In this example, each of the transmitters generates a sum image component that lags the corresponding delta image component by a phase shift of 180°, so coherent combination is implemented simply by reversing the sign of the sum image component segment before summing with the delta image component segment. For example, a first phase shifter circuit 1505 applies a 180° phase shift to the first transmitter's sum image component for combination with the first transmitter's delta image component at the summing circuit 1506 to generate a coherently combined signal which has sample indices reversed at the index reversal circuit 1513 to generate the output Tx2 signal 1520. In addition, a second phase shifter circuit 1507 applies a 180° phase shift to the second transmitter's sum image component for combination with the second transmitter's delta image component at the summing circuit 1508 to generate a coherently combined signal which has sample indices reversed at the index reversal circuit 1514 to generate the output Tx2 signal 1521. In addition, a third phase shifter circuit 1509 applies a 180° phase shift to the third transmitter's sum image component for combination with the third transmitter's delta image component at the summing circuit 1510 to generate a coherently combined signal which has sample indices reversed at the index reversal circuit 1515 to generate the output Tx3 signal 1522. And finally, a fourth phase shifter circuit 1511 applies a 180° phase shift to the fourth transmitter's sum image component for combination with the fourth transmitter's delta image component at the summing circuit 1512 to generate a coherently combined signal which has sample indices reversed at the index reversal circuit 1516 to generate the output Tx4 signal 1523. As a result, the coherently combined delta and sum image components for the transmitters 1520-1523 result in a quadrupled target echo signal power, a doubled noise power, and a doubled SNR.

As illustrated with the example solution shown in FIG. 15, the ADC sampling rate of 320 MHz supports four transmitters. Thus, the number of supported transmitters is halved in comparison to the example shown in FIG. 12B, given the same ADC sampling rate (namely 320 MHz). However, the receiver module may be configured to support additional transmitters by increasing the ADC sampling rate to fit each additional transmitter.

Figure 16A:
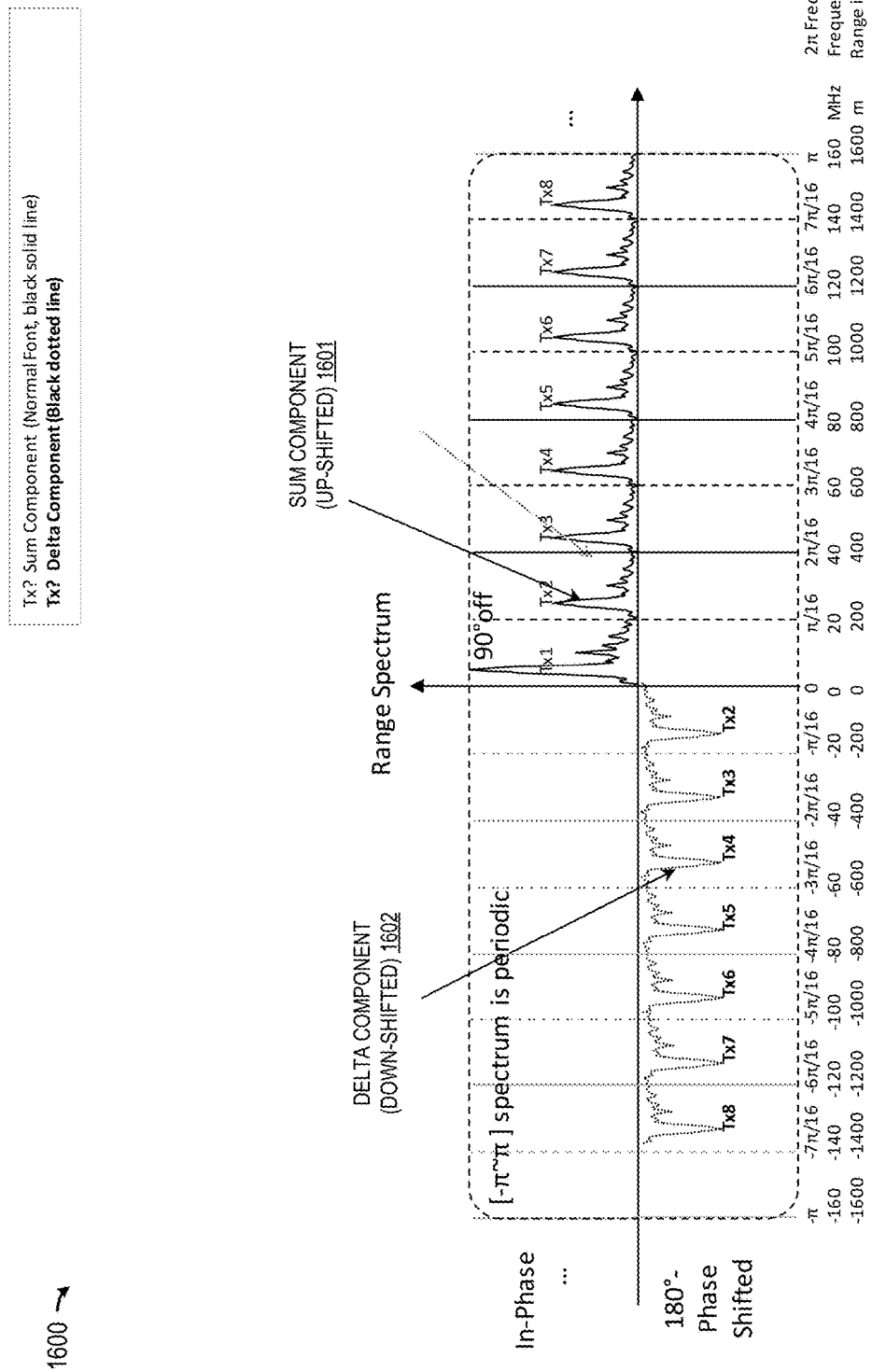
FIG. 16A depicts a fast-time range FFT spectrum of a frequency offset modulation LFM range division MIMO automotive radar system such as shown in FIG. 3A which uses I-branch only FOM mixer range spectrum with sufficient frequency offset in combination with PQ-channel analog-to-digital converter in the receiver in accordance with selected embodiments of the present disclosure.

To provide additional details for an improved understanding of selected embodiments of the present disclosure, reference is now made to FIG. 16A which depicts a fast-time range FFT spectrum 1600 of a frequency offset modulation LFM range division MIMO automotive radar system such as shown in FIG. 3A which uses I-branch only FOM mixer range spectrum with sufficient frequency offset in combination with I/Q-channel analog-to-digital converter in the receiver. In the depicted embodiment, the transmitter uses I-channel only FOM mixers connected to all but the first transmit channel circuit to generate transmit channel offsets at 0 MHz, 20 MHz, 40 MHz, 60 MHz, 80 MHz, 100 MHz, 120 MHz, and 140 MHz. At the receiver, an I/Q channel ADC is provided with a sampling rate of 320 MHz to create, for each transmitter (Txi), an upshifted sum component 1601 (shown with the black solid line and normal font) and a downshifted delta component 1602 (shown with the dotted black line and bold-faced font). Since the I-only FOM mixers on transmit module divide the transmit power into the sum and delta components, the received signal power is also halved if only the sum or delta component is processed at the receiver (except for the first transmit channel). When I-channel only FOM mixers are used at the transmitter and the I/Q ADC is used at the receiver, the delta components may alias into sum components if sampling frequency is not sufficiently high, causing cancelation or interference. FIG. 16A shows the case of the minimally required sampling frequency for the I/Q ADC.

Once the separation of transmitters and the sum and delta spectral segments are done, a final spectrum can be produced for each transmitter by using a combination of phase shifter and summing circuits to coherently combine the sum and delta spectrums in the digital domain. In this example, it is noted that the first transmitter Tx1 does not undergo the FOM mixing, so it is ahead of the sum component outputs by 90 degrees in phase. As a result, the sum and delta components of the transmitters Tx2-Tx8 can be coherently combined after applying the 180° phase shift to the delta component, while the sum component of the first transmitter Tx1 is phase shifted by −90° to be in phase with other channels. As illustrated with the example solution shown in FIG. 16A, the ADC sampling rate of 320 MHz supports eight transmitters.

Figure 16B:
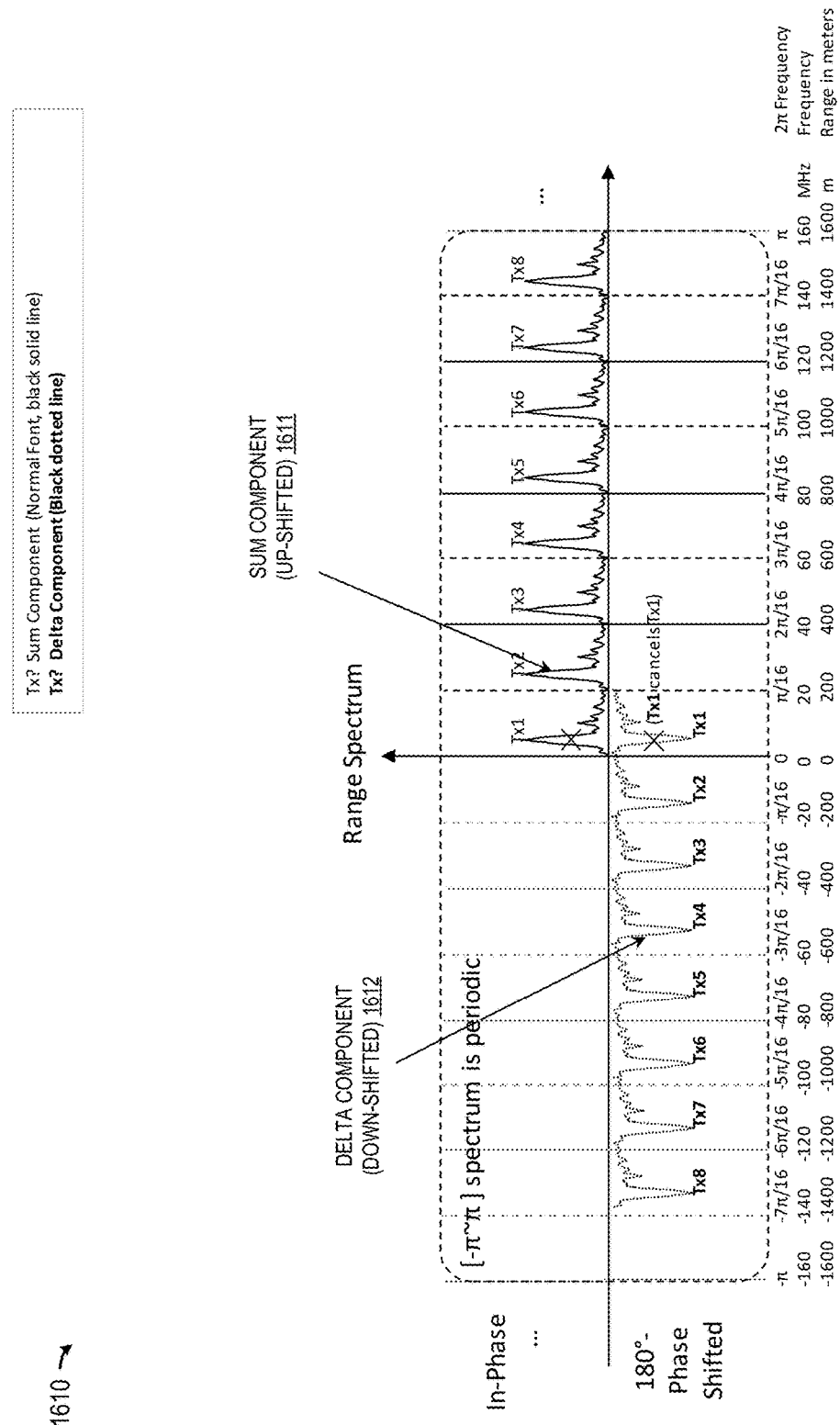
FIG. 16B depicts a fast-time range FFT spectrum of a frequency offset modulation LFM range division MIMO automotive radar system such as shown in FIG. 3B which uses I-branch only FOM mixer range spectrum with insufficient frequency offset for the first transmitter in combination with PQ-channel analog-to-digital converter in the receiver in accordance with selected embodiments of the present disclosure.

To provide additional details for an improved understanding of selected embodiments of the present disclosure, reference is now made to FIG. 16B which depicts a fast-time range FFT spectrum 1610 of a frequency offset modulation LFM range division MIMO automotive radar system such as shown in FIG. 3B which uses I-branch only FOM mixer range spectrum with insufficient frequency offset in combination with I/Q-channel analog-to-digital converter in the receiver. In the depicted embodiment, the transmitter uses I-channel only FOM mixers connected to all but the first transmit channel circuit to generate transmit channel offsets at 0 MHz, 20 MHz, 40 MHz, 60 MHz, 80 MHz, 100 MHz, 120 MHz, and 140 MHz. At the receiver, an I/Q channel ADC is provided with a sampling rate of 320 MHz to create, for each transmitter (Txi), an upshifted sum component 1611 (shown with the black solid line and normal font) and a downshifted delta component 1612 (shown with the dotted black line and bold-faced font). Since the I-only FOM mixers on transmit module divide the transmit power into the sum and delta components, the received signal power is also halved if only the sum or delta component is processed at the receiver (except for the first transmit channel). When I-channel only FOM mixers are used at the transmitter and the I/Q ADC is used at the receiver, the delta components may alias into sum components if sampling frequency is not sufficiently high, causing cancelation or interference. FIG. 16B shows the case where the upshifted sum component from the first transmitter Tx1 is cancelled by the downshifted delta component from the first transmitter Tx1.

Figure 16C:
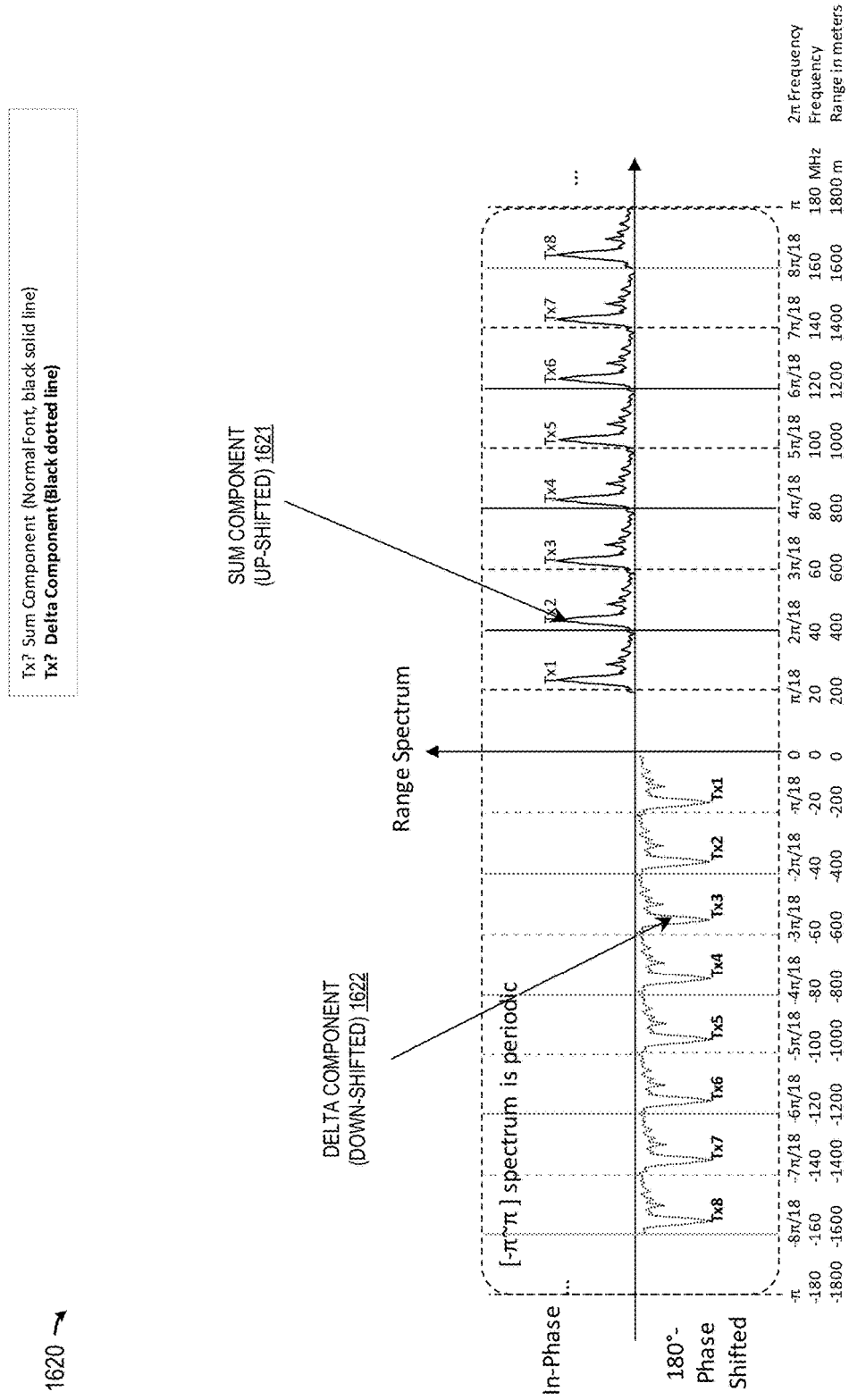
FIG. 16C depicts a fast-time range FFT spectrum of a frequency offset modulation LFM range division MIMO automotive radar system such as shown in FIG. 3B which uses I-branch only FOM mixer range spectrum with sufficient frequency offset for the first transmitter in combination with PQ-channel analog-to-digital converter in the receiver in accordance with selected embodiments of the present disclosure.

To avoid interference or cancellation of the first transmitter Tx1, a carrier frequency offset should also be applied to the first transmitter Tx1 and the sampling frequency should be increased to fit all transmitters unambiguously. An example embodiment of such a solution is illustrated in FIG. 16C which depicts a fast-time range FFT spectrum 1620 of a frequency offset modulation LFM range division MIMO automotive radar system such as shown in FIG. 3B which uses I-branch only FOM mixer range spectrum with sufficient frequency offset in combination with I/Q-channel analog-to-digital converter in the receiver in accordance with selected embodiments of the present disclosure. In the depicted embodiment, the transmitter uses I-channel only FOM mixers connected to all transmit channel circuits to generate transmit channel offsets at 20 MHz, 40 MHz, 60 MHz, 80 MHz, 100 MHz, 120 MHz, 140 MHz, and 160 MHz. At the receiver, an I/Q channel ADC is provided with a sampling rate of 320 MHz to create, for each transmitter (Txi), an upshifted sum component 1611 (shown with the black solid line and normal font) and a downshifted delta component 1612 (shown with the dotted black line and bold-faced font). Since the I-only FOM mixers on transmit module divide the transmit power into the sum and delta components, the received signal power is also halved if only the sum or delta component is processed at the receiver (except for the first transmit channel). When I-channel only FOM mixers at the transmitter (including the first transmitter Tx1) are each offset by an integer multiple of the frequency offset $f_\Delta$ and the I/Q ADC at the receiver uses a sufficiently high sampling frequency, the delta components do not alias into the sum components, thereby avoiding cancelation or interference.

Once the separation of transmitters and the sum and delta spectral segments are done, a final spectrum can be produced for each transmitter by using a combination of phase shifter and summing circuits to coherently combine the sum and delta spectrums in the digital domain, provided that the ADC sampling frequency is increased to fit all transmitters unambiguously. In this example, it is noted that the first transmitter Tx1 undergoes FOM mixing along with the rest of the transmitters. As a result, the sum and delta components of the transmitters Tx1-Tx8 can be coherently combined after applying the 180° phase shift to the respective delta components. As illustrated with the example solution shown in FIG. 16C, the ADC sampling rate of 360 MHz supports eight transmitters.

While selected embodiments of the FOM MIMO scheme are described with reference to using an offset frequency generator to generate unique frequency offset tones for each transmit channel, it will be appreciated that other frequency offset modulation schemes may also be used. For example, selected FOM implementations may use a fast-time phase shifter at each transmit channel circuit of the transmit module in combination with a high speed ADC at the receiver module, thereby eliminating the need for I/Q modulation mixers at the transmit module.

Figure 17:
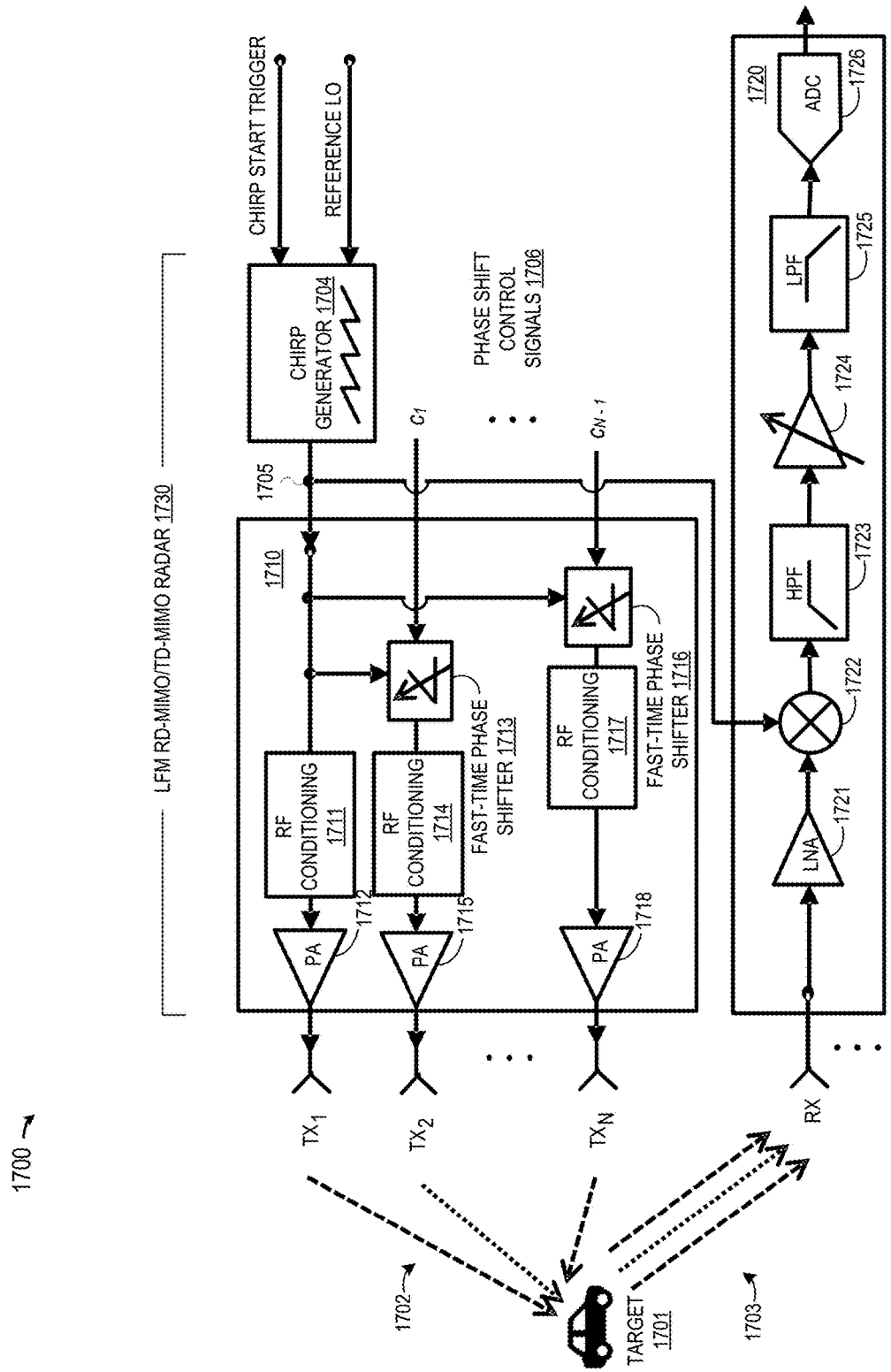
FIG. 17 is a simplified schematic block diagram of a frequency offset modulation LFM range division MIMO automotive radar system implemented with fast-time phase shifters in accordance with selected embodiments of the present disclosure.

To provide additional details for an improved understanding of selected phase shifter embodiments of the present disclosure, reference is now made to FIG. 17 which depicts a simplified schematic block diagram of a frequency offset modulation LFM range division MIMO automotive radar system 1700 which includes an LFM RD-MIMO radar device 1730 having fast-time phase shifters in the transmit module 1710 which are connected and configured to transmit and receive LFM waveforms 1702, 1703 for reflection by a target 1701 to the receive module 1720 under control of a radar controller processor (not shown). In selected embodiments, the LFM RD-MIMO radar device 1730 and/or radar controller processor may be embodied as a line-replaceable unit (LRU) or modular component that is designed to be replaced quickly at an operating location. In addition and as described hereinbelow, the LFM RD-MIMO radar device 1730 may also be configured to perform time-division multiplexing of the transmitted LFM waveforms 1702, 1703 to implement a combined time-division and range-division MIMO scheme to separate the transmitters not only in the range domain, but also in the time domain.

As depicted, each radar device 1730 includes one or more transmitting antenna elements TXi and at least a first receiving antenna element RX connected, respectively, to one or more radio frequency (RF) transmit modules 1710 and receive module 1720. At each transmit module 1710, a transmit channel circuit is provided for each transmit antenna. For example, a first transmit channel circuit includes a first RF conditioning module 1711 and power amplifier 1712 connected to a first transmit antenna $TX_1$, a second transmit channel circuit includes a second RF conditioning module 1714 and power amplifier 1715 connected to a second transmit antenna $TX_2$, and so on with the Nth transmit channel circuit including an Nth RF conditioning module 1717 and power amplifier 1718 connected to the Nth transmit antenna $TX_N$.

In addition, each radar device 1730 includes a chirp generator 1704 which is configured and connected to supply a chirp input signal 1705 to the different transmit channel circuits 1711/1712, 1714/1715, 1717/1718 in the transmitter module(s) 1710. However, instead of providing the chirp input signal 1705 directly to all of the transmit channel circuits, the radar device 1730 also includes a programmable fast-time phase shifter circuits which are connected to phase shift the chirp input signal 1705, thereby creating progressive phase shifts which mimic the effects of a frequency offset for the transmit antennas ($TX_1$-$TX_N$). To this end, the first transmit channel circuit 1711/1712 may be connected to directly receive the chirp input signal 1705. However, the second transmit channel circuit 1714/1715 may include a first fast-time phase shifter 1713 which is connected to apply a first phase shift to the chirp input signal 1705 before being filtered and amplified by the second transmit channel circuit 1714/1715 for transmission over the antenna $TX_2$. In similar fashion, the remaining transmit channel circuits (e.g., 1717/1718) may include a fast-time phase shifter (e.g., 1716) which is connected to apply a unique phase shift to the chirp input signal 1705 before being filtered and amplified by the antenna (e.g., $TX_N$).

As disclosed herein, each of the phase shifters 1713, 1717 may be implemented with a programable phase shifter having a fast switching time or response time. For example, phase shift control signals 1706 can be applied to programmable K-bit phase shifters 1713, 1716 to create progressive phase shifts at the transmitter module 1710, thereby mimicking the effects of frequency offset for $2^{(K-1)}$ transmitters. In selected embodiments, the phase shifters 1713, 1716 are used to introduce regular progressive phase shift at fast-time sampling intervals. For example, a 1-bit phase shifter with switching positions {0°, 180°} can cause frequency offsets of $\{0, 1/(2T_s)\}$ [Hz], where $T_s$ is fast-time sampling interval as well as the switching interval of the phase shifter in seconds. For another example, a 4-bit phase shifter with switching positions {0°, 22.5°, 45°, 67.5°, 90°, 112.5°, 135°, 157.5°, 180°, 202.5°, 225°, 247.5°, 270°, 292.5°, 315°, 337.5°} can cause frequency offsets of $\{0, 1/(32T_s), 2/(32T_s), 3/(32T_s), 4/(32T_s), 5/(32T_s), 6/(32T_s), 7/(32T_s)\}$ [Hz]. In this case, a $T_s$ corresponding to a switching frequency of 320 MHz allows for 8 transmitters to share a total of 320 MHz of fast-time spectrum, each occupying a segment of 40 MHz, whose integer {0, 1, 2 ... 7} multiples are the amount of frequency offsets applied to the transmitters.

In principle, a K-bit phase shifter can support up to $2^{(K-1)}$ transmitters. In addition, a frequency offset of $f_\Delta$ Hz is equivalent to imposing a progressive phase shift in time by a rate of $2\pi f_\Delta$ radians per second. At a sampling rate of $f_\Delta$ Hz (or sampling interval of $T_s$ which equals to $1/f_s$), the amount of progressive (or additive) phase shift per $T_s$ interval is then $2\pi f_\Delta/f_s$ radians. To comply with the Nyquist sampling theorem, the phase shifter switched at fast-time sampling rate can support a maximum frequency offset of $1/(2T_s)$ Hz.

In one example, the transmitter module 1710 may be programmed with phase shift control signals 1716 so that the phase shifters 1713, 1716 provide a progressive phase shift of 45 degrees (e.g., {0°, 45°, 90°, 135°, 180°, 225°, 270°, 315°, 0°, 45°, ...}) at intervals of $T_{sw}$ seconds. With this arrangement, a complete a phase shift is imposed on the reference chirp every 8 intervals such that an effective frequency offset of $\frac{1}{8}T_s$ Hz is imposed on the chirp signal. For another example, the transmitter module 1710 may be programmed with a 337.5° progress phase shift per switching interval, resulting in the application of the following progressive phase shift: {0°, 337.5°, 315°, 292.5°, 270°, 247.5°, 225°, 202.5°, 180°, 157.5°, 135°, 112.5°, 90°, 67.5°, 45°, 22.5°, 0°, ... }. The resulting progressive phase shift has a step size of −22.5° to effectively apply a negative frequency offset. Based on Nyquist criteria, a progressive phase shift with a step size no more than 180° may be applied without incurring ambiguity. As a result, 4-bit phase shifters can be used to support up to 8 frequency offsets (including the zero offset).

To ensure sufficient range space on the transmit spectrum is available for division amongst all transmitters, a faster analog-to-digital converter (ADC) 1726 may be employed at each receive channel 1720. For example, an LFM RD-MIMO radar device 1730 using fast-time phase shifters 1713, 1716 to implement frequency offset modulation should use an ADC sampling rate that is increased to N×40 Msps. As a result, the fast-time FFT processing can divide the spectrum into N consecutive segments, with each being associated with a corresponding transmitter.

With the fast-time phase shifters 1713, 1716 phase-shifting the chirp input signal 1705 under control of the phase shift control signals 1706 before transmission on the transmit antennas $TX_1$-$TX_N$, the combined reflected LFM waveforms 1703 are received and processed by the receiver module 1720. In particular, the receive antenna RX receives the combined reflected LFM waveforms 1703 which are then amplified by the low noise amplifier (LNA) 1721. At the I/Q mixer 1722, the amplified receive signal is mixed with the reference chirp signal 1705 before being conditioned for digital conversion by the high pass filter 1723, variable gain amplifier 1724, low pass filter 1725, and analog-to-digital converter 1726.

Generally speaking, the implementation of frequency offset modulation using fast-time phase shifters differs from a phase-coded chirp system where the phase shift switching interval may not coincide with the fast-time sampling rate and where the phase shift usually follows an orthogonal code pattern which is not a progressive phase shift. In code-division MIMO systems, the transmitters are separated by transmitting a unique phase-coded waveform that is orthogonal to those of other transmitters, and the receivers require a receiver bank of correlators to decode the signals from individual transmitters. This differs from the range-division principle of the present invention.

As disclosed herein, the use of frequency offset modulation in an LFM automotive radar systems enables very large MIMO arrays to be formed by separating transmitter signals in the fast-time Fourier or the range domain. The resulting virtual array is much larger than the conventional TD-MIMO approach, thereby achieving high angular resolution performance. However, by combining the FOM RD MIMO approach with TD MIMO approach, even larger MIMO virtual arrays can be formed with the additional benefit of mitigating or reducing the problem of strong beyond-maximum-range target interference than an arise with FOM RD MIMO only systems. In particular, this combined approach allows the separation of the transmitters not only in the range domain, but also in the time domain to allow the detection of extremely large RCS targets that are beyond the maximum unambiguous range measurable for each transmitter. To implement the time-domain separation, the LFM RD- MIMO radar device 330A may be implemented as a combination LFM RD-MIMO/TD-MIMO radar device 330A which is configured to activate adjacent transmitters in an alternating fashion over time. With the time-domain modulation implemented at the transmit module 310A, the received transmit spectrum includes, for each transmitter range spectrum segment, an adjacent range spectrum segment that is vacant, thereby allowing strong beyond-the-range targets to be freely present and correctly detected.

One of the benefits from combining the FOM and TD MIMO approaches arises from the detection distance limitations of the FOM MIMO approach alone. In particular, the FOM MIMO approach effectively divides, at each receive channel, the entire range spectrum into N segments, each containing the range spectrum of a corresponding individual transmitter. In some cases, the maximum range extent of an individual range spectrum is not large enough to contain all detectable targets (especially for targets with extremely large radar cross-sections) at a distance that is longer than the maximum range of the individual transmitter. In such cases, these strong beyond-the-range targets show up at the range spectrum of the next transmitter, causing false detections or at least ambiguous detections. To avoid this, a longer-range extent may be allocated to each transmitter by allocating more IF frequency spectrum for each transmitter. However, this results in higher ADC sampling rate requirements or fewer transmitters fitting into the total range spectrum for the same ADC sampling rate. This trade-off can be avoided by combining the time division MIMO principle with the FOM Range Division MIMO principle to allow larger range extent while not reducing the maximum number of transmitters that can be supported at the expense of increased frame duration.

Figure 18:
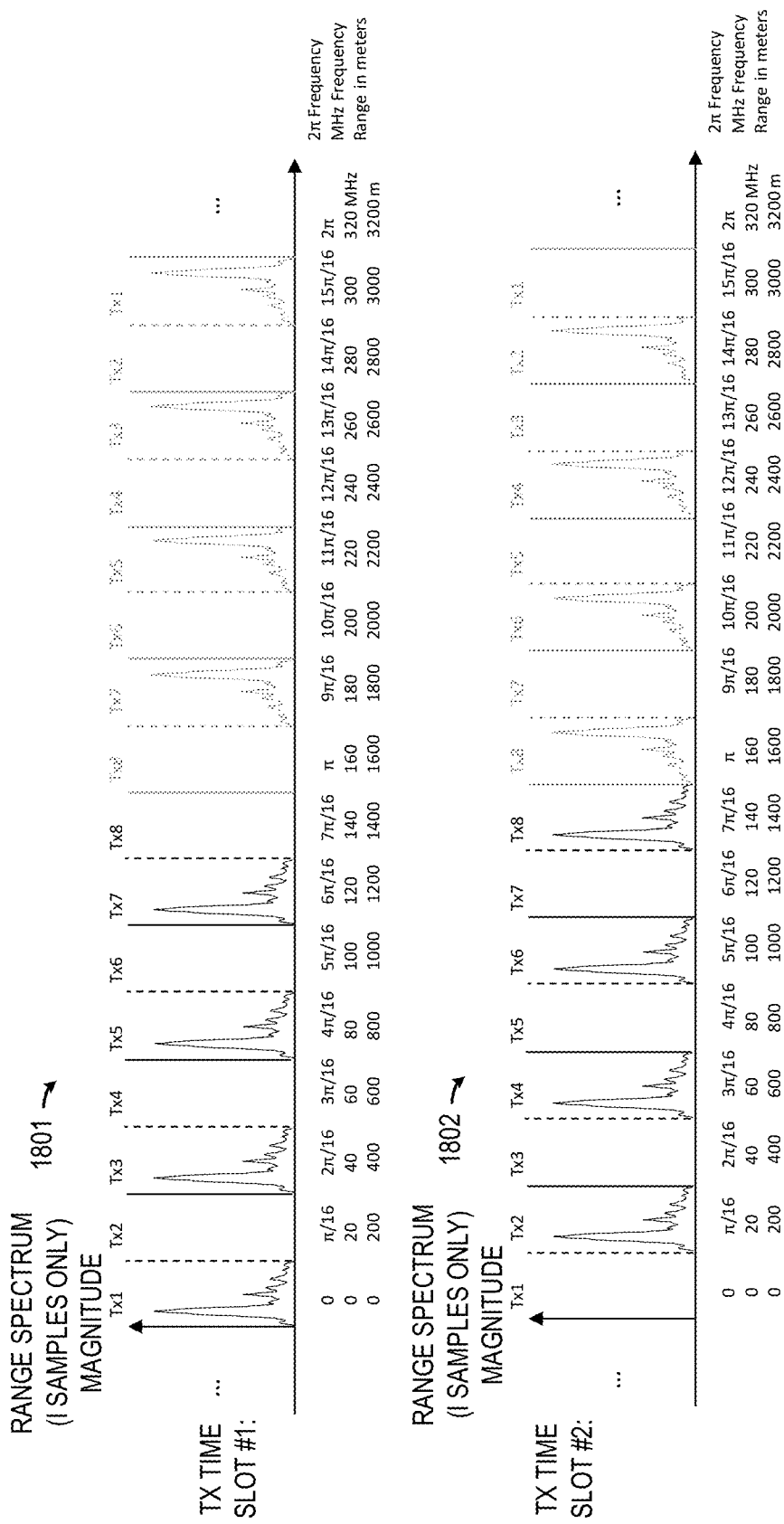
FIG. 18 depicts a fast-time range FFT spectrum for two time slots of a receiver channel of an PQ sample for an 8-transmitter MIMO automotive radar which employs both time-division and frequency offset modulated LFM range-division radar techniques in accordance with selected embodiments of the present disclosure.

As disclosed herein, the TD and RD MIMO approaches can be combined with a variety of different schemes. For example, a combined TD and RD MIMO scheme may separately transmit the odd-number transmitters and the even-number transmitters in two groups so that the transmission for each chirp is divided with the first group of odd-numbered transmitters being transmitted first, and with the second group of even-numbered transmitters being transmitted second. To illustrate an example grouping, reference is now made to FIG. 18 which depicts first and second fast-time range FFT spectrums 1801, 1802 for two time slots of a receiver channel of an I/Q sample for an 8-transmitter MIMO automotive radar which employs both time-division and frequency offset modulated LFM range-division radar techniques. In this example, it is assumed that the range spectrum is divided by transmitters Tx1, Tx2, Tx3, TxN in a sequential fashion and adjacent-numbered transmitters' range spectrum are also adjacent to each other. In the depicted arrangement, the first group is first transmitted from the odd-numbered transmitters (e.g., Tx1, Tx3, Tx5, Tx7), followed by transmission from the even-numbered transmitters (e.g., Tx2, Tx4, Tx6 Tx8). In the range spectrum of time slot #1 1801, the even-numbered transmitters do not transmit so the corresponding range spectrum segments Tx2, Tx4, Tx6, Tx8 are vacant, allowing strong beyond-the-range targets to be present and detected in these vacant segments in an unambiguous fashion. Likewise, in the range spectrum of time slot #2 1802, the odd-numbered transmitters Tx1, Tx3, Tx5, Tx7 do not transmit which leaves the corresponding range spectrum segments vacant so that strong beyond-the-range targets can be freely present and detected. This approach effectively doubles the maximum range of the radar system. As seen from this example, the temporal separation of transmissions from the first group from the second group in the time domain, in combination with separation in the frequency or range domain, greatly reduces the chance of a strong beyond-the-range target interference between adjacent transmitters. While the combined TD and RD approach greatly reduces the risk of interference due to strong beyond-the-range targets, if such interference is not a practical concern, the combined TD and RD approach also increases the number of transmitters supported.

As will be noted, the last transmitter (e.g., Tx8) does not have additional free room for ambiguous detection of the strong beyond-the-range targets due to the conjugate symmetric nature of the I-sample only spectrum. Such ambiguity may be tolerated because it does not occur in the rest of transmitters' range spectrums. Because of such inconsistency in the range spectrum, the ambiguous target will not be coherently integrated in the subsequent Doppler and angle processing such that its impact is minimized. If such tolerance is not acceptable, the limitation may be addressed by increasing the ADC sampling rate by one transmitter's IF frequency extent. Alternatively, the maximum number of transmitters should be reduced by one without increased ADC sampling rate. In yet another alternative, the number of time slots can be increased (e.g., more than 2) to further reduce the chance of ambiguous detections. In such embodiments, the activated transmit antennas in any particular transmission time slot are separated from one another by two or more deactivated transmit antennas, depending on the number of time slots.

As disclosed herein, the FOM MIMO approach can be combined with other MIMO approaches besides TD MIMO schemes. For example, a combined Doppler Division and Range Division MIMO can be implemented to separate the transmitters in both the range domain (using FOM MIMO) and in the Doppler domain. Likewise, a combined Time Division, Doppler Division, and Range Division MIMO can be implemented to separate the transmitters not only in the range domain, but also in the Time and Doppler domains.

Figure 19:
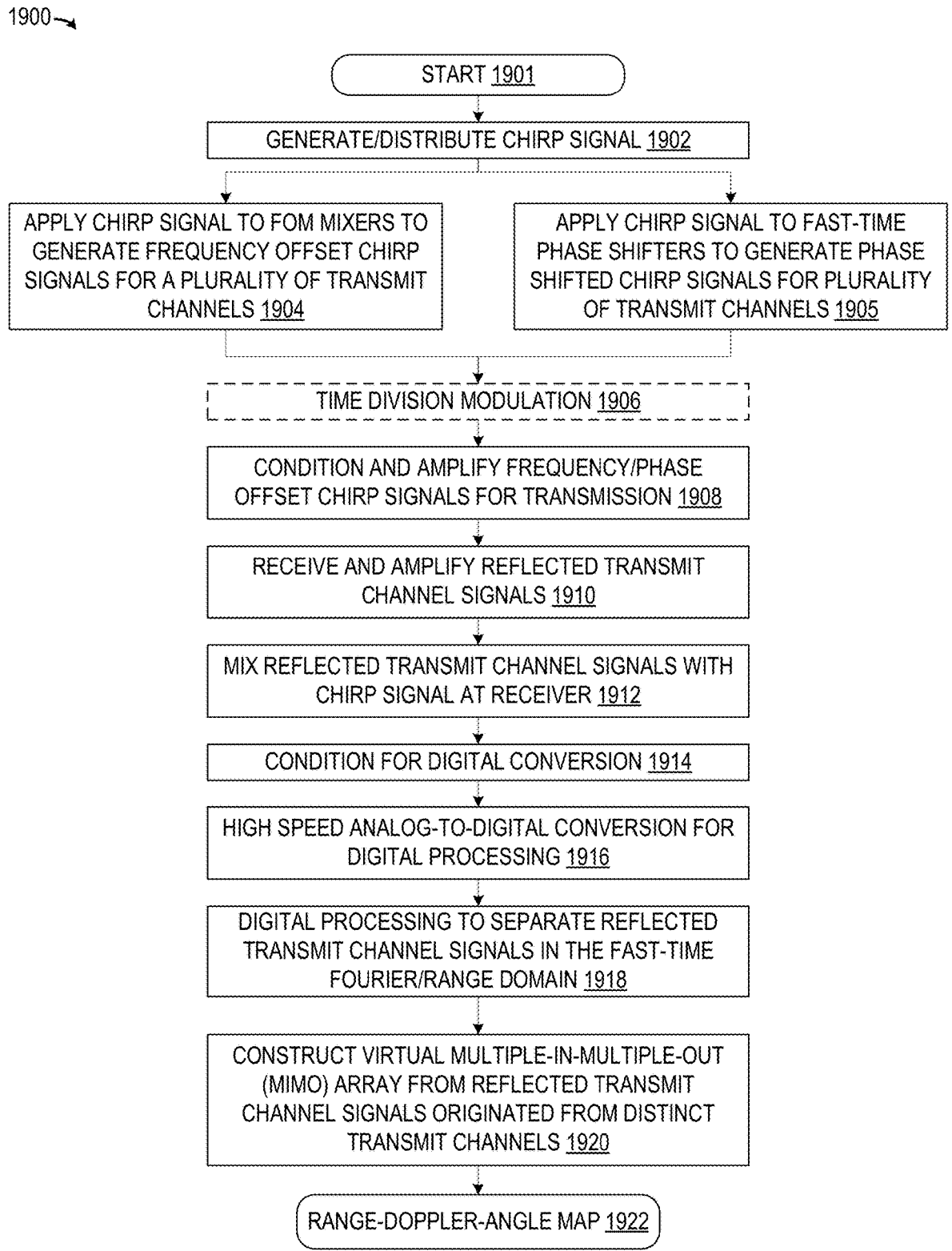
FIG. 19 illustrates a simplified flow chart showing the logic for using frequency offset modulation techniques to form a virtually large MIMO radar arrays.

To provide additional details for an improved understanding of selected embodiments of the present disclosure, reference is now made to FIG. 19 which depicts a simplified flow chart 1900 showing the logic for using frequency offset modulation techniques to form virtually large MIMO radar arrays. In an example embodiment, the control logic and methodology shown in FIG. 19 may be implemented as hardware and/or software on a host computing system, processor, or microcontroller unit that includes processor and memory for storing programming control code for constructing and operating a large virtual MIMO radar arrays by introducing frequency offset modulations signals to reference chirp signals to enable separation of the transmitter signals in the fast-time Fourier or the range domain.

The process starts (step 1901), such as when the radar system begins the process of sensing the location and movement of one or more target objects using one or more transmit radar signals that are sent over a plurality of transmit antennas. To generate the transmit radar signals, the radar system first generates a reference chirp signal (step 1902), such as by periodically modulating a transmit radar signal with a frequency and/or phase shift. For example, with automotive Frequency Modulation Continuous Wave (FMCW) radars, the reference chirp signal may be generated as a Linear Frequency Modulation (LFM) waveform that is distributed to a plurality of transmit channel circuits which are respectively associated with a plurality of transmit antennas.

At step 1904, the reference chirp signal is applied to a plurality of frequency offset modulation (FOM) mixers to generate frequency offset chirp signals for a plurality of transmit channels. In selected embodiments, the FOM mixing step may be implemented by applying the reference chirp signal to a plurality of FOM mixers which are each respectively connected to receive a plurality of defined frequency offset tones for mixing with the reference chirp signal, thereby generating a plurality of different frequency offset reference chirp signals for use with the plurality of transmit channel circuits. In addition, one of the transmit channel circuits may be connected to directly receive the reference chirp signal without any frequency offset modulation. In selected embodiments, the frequency offset mixer may be implemented with an I/Q channel modulation mixer, an I-channel only modulation mixer, or a Q-channel only modulation mixer to implement a spectrum-coherent integration approach. By using frequency offset modulation mixers to mix the reference chirp signal as an LFM waveform at each transmit channel with different frequency offset signals (e.g., $\Delta f$, $2\Delta f$, etc.), the receiver may employ a high sampling rate ADC to allow separation of different transmitters' transmit signals in the received range spectrum.

As an alternative step 1905, the reference chirp signal is applied to a plurality of fast-time phase shifters to generate phase-shifted chirp signals for a plurality of transmit channels. In selected embodiments, the phase shifting step may be implemented by applying the reference chirp signal to a plurality of phase shifters which are respectively controlled by a phase shift control signal, thereby generating a plurality of different frequency offset reference chirp signals for use with the plurality of transmit channel circuits. In addition, one of the transmit channel circuits may be connected to directly receive the reference chirp signal without any phase shift modulation. By using phase shifters to introduce regular progressive phase shifts to the reference chirp signal at each transmit channel example, the phase shifters effectively mimic the effects of frequency offset modulation, thereby enabling the receiver to employ a high sampling rate ADC to allow separation of different transmitters' transmit signals in the received range spectrum.

As an optional step 1906, time division modulation may be applied to the plurality of different frequency offset reference chirp signals for use with the plurality of transmit channel circuits. As indicated with the dashed lines, the time division modulation step may be omitted or skipped in the disclosed sequence 1900. However, selected embodiments of the time division modulation step may employ an alternating transmission scheme whereby multiple transmit time slots are defined such that a first set of alternating transmit channels (e.g., even-numbered transmitters) are active in a first time slot and are suppressed in a second time slot, while a second set of alternating transmit channels (e.g., odd-numbered transmitters) are active in a second time slot and are suppressed in a first time slot. In this configuration, for each transmitter, its adjacent range spectrum segment is vacant, thereby enabling strong beyond-the-range targets to be corrected detected without imposing target interference.

At step 1908, the frequency offset or phase-shifted reference chirp signals are conditioned and amplified for transmission over the corresponding transmit channel circuits. In selected embodiments, this processing is performed by the transmit channel circuits which each include an RF conditioning module (which filters the output of the corresponding FOM mixer or phase shifter) and power amplifier (which amplifies the RF conditioning module output for transmission over a corresponding transmit antenna). In embodiments where time-domain modulation is used in combination with the frequency/phase offset modulation, the non-adjacent transmit channel circuits may be controlled to sequentially condition and amplify transmit radar waveforms from non-adjacent transmit antennas.

At step 1910, the reflected frequency/phase offset reference chirp signals from the different transmit channels are received and amplified at the receiver. In selected embodiments, one or more receive antennas at the receiver module receive target returns from the transmitted frequency/phase offset reference chirp signal waveforms as (radio frequency) antenna signals for subsequent amplification, such as by using a low noise amplifier to generate an amplified RF signal from the target returns.

At step 1912, the amplified transmit channel signals are mixed with the reference chirp signal at the receiver to generate an intermediate frequency (IF) signal. In selected embodiments, the mixing step may be implemented by applying the reference chirp signal to a receiver module mixer which is also connected to receive the amplified transmit channel signals for mixing with the reference chirp signal, thereby generating an intermediate frequency signal.

At step 1914, the intermediate frequency signal is conditioned for digital conversion. In selected embodiments, the conditioning process includes feeding the intermediate frequency signal to a high-pass filter, amplifying the filtered signal with a variable gain amplifier before being fed to a low-pass filter, thereby generating a re-filtered signal.

At step 1916, the re-filtered conditioned IF signal is fed to a high-speed analog/digital converter (ADC) which has a digital signal output that is suitable for digital processing. Because the maximum unambiguous range extent for each frequency offset reference chirp signal is inversely related to the fast-time sampling interval, the ADC has a high sampling rate. For example, if a conventional TD-MIMO FCM radar uses a 40 mega-samples-per-second (Msps) ADC in the receiver module, the ADC sampling rate is increased to N×40 Msps to enable the N-transmitters MIMO operation using the disclosed FOM approach. Note also that depending on the radar system requirements and also upon the actual performance of the low-pass filter that directly precedes the ADC, the sample rate of the ADC may need to be increased beyond N×40 Msps.

At step 1918, the digital processing is applied to separate the reflected transmit channel signals in the fast-time FFT or range domain, along with other radar signal processing steps. While any suitable radar signal processing steps may be used, each radar may be configured to perform fast-time FFT and slow-time FFT processing on the received radar signal to derive range and Doppler information. In the fast-time FFT processing, the frequency offset modulation of the reference chirp signals sent over the N transmission channels enables the spectrum to be divided into N consecutive segments with each being associated with a corresponding transmitter. Because the transmitters are separated or divided in the range domain and the waveform is based on LFM, the approach can also be referred to as the LFM range-division (RD) MIMO approach. Based on the range-spectrum division arrangement, the fast-time samples associated with distinct transmitters are then recovered (and whose sum and delta components are coherently summed for the case of I-channel only FOM,) and the subsequent MIMO virtual array processing can be carried out.

At step 1920, the virtual MIMO array is constructed from the reflected transmit channel signals which originated from distinct transmit channels. In selected embodiments, the frequency/phase offset reference chirp signal target return data samples received from the distinct transmit channels are processed using mono-static and/or bi-static radar principles to construct and accumulate MIMO virtual array outputs.

At step 1922, the MIMO virtual array outputs are processed by range, Doppler, and angle estimation processes and the target map is generated to identify the range, Doppler, and angle values for each detected target. The range, Doppler, and angle estimators are typically based on Fast Fourier Transform (FFT) and Discrete Fourier Transform (DFT) processors. More advanced spectral estimators including but not limited to Multiple-signal Classifier (MUSIC) and Estimator of Signal Parameters via Rotational Invariance Technique (ESPRIT) processors, may also be used for angle processing. In selected embodiments, the radar controller processor may be configured to produce map data identifying paired range (r), Doppler ($\dot{r}$) and angle (θ) values for each detected/target object.

As disclosed herein, selected embodiments of the disclosed frequency offset modulation range division MIMO radar system may provide several enhancements when compared with conventional radar systems. In addition to enabling the construction of very large MIMO arrays for automotive Frequency Modulation Continuous Wave (FMCW) radars that transmit Linear Frequency Modulation (LFM) waveforms, the disclosed radar system can use RF front-end and signal processing blocks of existing radar designs without significant modifications, thereby minimizing the cost of developing the new solution. In addition, the combination of FOM RD and TD MIMO approaches enables strong beyond-the-range targets to be corrected detected without imposing target interference. In addition, the present disclosure enables the number of virtual antenna elements to be constructed via a MIMO approach to equal the product of the number of physical transmit and receiver antenna elements, thereby forming a larger aperture than can be formed from the total number of physical elements and improving the angular resolution.

By now it should be appreciated that there has been provided a radar architecture, circuit, method, and system in which a reference signal generator is configured to produce a transmit reference signal a sequence of waveforms (e.g., a chirp signal). In addition, a waveform generator is configured to produce a plurality of transmit signals, each having a different frequency offset from the transmit reference signal. In selected embodiments, the waveform generator includes a frequency offset signal generator for generating a plurality of different frequency offset tones, and a plurality of frequency offset modulation mixers, each connected to mix the transmit reference signal with one of the plurality of different frequency offset tones, thereby generating a frequency offset transmit reference signal as one of the N radio frequency encoded transmit signals. In other embodiments, the waveform generator includes a plurality of fast-time phase shifters, each connected to receive the transmit reference signal, thereby generating a frequency offset transmit reference signal as one of the N radio frequency encoded transmit signals. In such embodiments, the plurality of fast-time phase shifters may include a bank of K-bit phase shifters for introducing a regular progressive phase shift to the transmit reference signal at fast-time sampling intervals. The radar system also includes a signal encoder to encode the plurality of transmit signals using a signal conditioning and power amplification to produce and transmit N radio frequency encoded transmit signals over N transmit antennas. In selected embodiments, the signal encoder is configured to encode the plurality of transmit signals using time division multiplexing to produce a first set of N radio frequency encoded transmit signals for transmission over a first set of N transmit antennas during a first time slot, and to produce a second set of N radio frequency encoded transmit signals for transmission over a second set of N transmit antennas during a second time slot. In such embodiments, the signal encoder may be configured activate even-numbered transmit antennas for transmitting the first set of N radio frequency encoded transmit signals during the first time slot, and to activate odd-numbered transmit antennas for transmitting the second set of N radio frequency encoded transmit signals during the second time slot. At a receiver module, at least a first receive antenna is provided to receive a target return signal reflected from the N radio frequency encoded transmit signals by a target. The receiver module also includes a downconverter that is configured to mix the target return signal with the transmit reference signal, thereby producing an intermediate frequency signal. In addition, a high-speed analog-to-digital converter is connected to convert the intermediate frequency signal to a digital signal. In selected embodiments, a notch filter bank is connected between the downconverter and the high-speed analog-to-digital converter for filtering the intermediate frequency signal to remove zero-range interference in a fast-time spectrum of each transmitter. In other embodiments, the downconverter is an I/Q mixer which is connected to first and second high-speed analog-to-digital converters which respectively convert the intermediate frequency signal to an I-channel digital signal and Q-channel digital signal. In selected FOM embodiments, the high-speed analog-to-digital converter has a sampling rate of at least N times of the minimally required sampling rate of a single-transmitter system that detects targets unambiguously in range. In selected TD/FOM embodiments, the high-speed analog-to-digital converter has a sampling rate of at least 2*N times of the minimally required sampling rate of a single-transmitter system that detects targets unambiguously in range. The radar system also includes a radar control processing unit that is configured to process the digital signal with fast time processing steps to generate a range spectrum comprising N segments which correspond, respectively, to the N radio frequency encoded transmit signals transmitted over the N transmit antennas. In selected embodiments, the radar control processing unit is also configured to construct a MIMO virtual array by extracting information corresponding to the N radio frequency encoded transmit signals from the N consecutive segments in the range spectrum.

In another form, there is provided a radar system architecture and method for operating same. In the disclosed methodology, a transmit reference signal is generated at a transmitter module, such as by generating a chirp signal. In addition, the transmitter module generates a plurality of transmit signals from the transmit reference signal, each having a different frequency offset from the transmit reference signal. In selected embodiments, the plurality of transmit signals are generated by first generating a plurality of different frequency offset tones, and then mixing the transmit reference signal with each of the plurality of frequency offset tones to generate the plurality of transmit signals. In such embodiments, a frequency offset generator generates the plurality of different frequency offset tones, and a plurality of frequency offset modulation mixers are connected to mix the transmit reference signal with one of the plurality of different frequency offset tones. In other embodiments, the plurality of transmit signals are generated by phase-shifting the transmit reference signal with a plurality of fast-time phase shifters in response to a plurality of phase shift control signals to generate the plurality of transmit signals. In such embodiments, the transmit reference signal is phase-shifted by applying the transmit reference signal to a bank of K-bit phase shifters to phase-shift the transmit reference signal by introducing a regular progressive phase shift to the transmit reference signal at fast-time sampling intervals. In addition, the transmitter module encodes the plurality of transmit signals using a signal conditioning and power amplification to produce N radio frequency encoded transmit signals. In addition, the transmitter module transmits the N radio frequency encoded transmit signals over N transmit antennas. In selected embodiments, the plurality of transmit signals are encoded using time division multiplexing to produce a first set of N radio frequency encoded transmit signals for transmission over a first set of N transmit antennas during a first time slot, and to produce a second set of N radio frequency encoded transmit signals for transmission over a second set of N transmit antennas during a second time slot. In such embodiments, the time division multiplexing includes activating even-numbered transmit antennas for transmitting the first set of N radio frequency encoded transmit signals during the first time slot, and activating odd-numbered transmit antennas for transmitting the second set of N radio frequency encoded transmit signals during the second time slot. At a first receive antenna, the receiver module receives a target return signal reflected from the N radio frequency encoded transmit signals by a target. In addition, the receiver module mixes the target return signal with the transmit reference signal to produce an intermediate frequency signal. In addition, the receiver module converts the intermediate frequency signal to a digital signal with a high-speed analog-to-digital converter so that the digital signal may be processed with fast time processing steps to generate a range spectrum comprising N segments which correspond, respectively, to the N radio frequency encoded transmit signals transmitted over the N transmit antennas. The disclosed methodology may also construct a MIMO virtual array by extracting information corresponding to the N radio frequency encoded transmit signals from the N consecutive segments in the range spectrum.

In yet another form, there is provided a computer program product stored in non-transitory machine-readable storage medium comprising instructions for execution by one or more processors in a radar system having N transmit antennas and a receive antenna for detecting an object. As disclosed, the computer program product includes instructions for configuring a reference signal generator to produce a transmit reference signal. In addition, the computer program product includes instructions for configuring a waveform generator to produce a plurality of transmit signals, each having a different frequency offset from the transmit reference signal, where the plurality of transmit signals are encoded using signal conditioning and power amplification to produce and transmit N radio frequency encoded transmit signals over N transmit antennas. In addition, the computer program product includes instructions for configuring a downconverter to produce an intermediate frequency signal by mixing the transmit reference signal with a target return signal which is received at the receive antenna as a result of the N radio frequency encoded transmit signals reflecting off the object. In addition, the computer program product includes instructions for configuring a high-speed analog-to-digital converter to convert the intermediate frequency signal to a digital signal. In addition, the computer program product includes instructions for configuring a radar control processing unit to process the digital signal with fast time processing steps to generate a range spectrum comprising N segments which correspond, respectively, to the N radio frequency encoded transmit signals transmitted over the N transmit antennas. In selected embodiments, the instructions for configuring the waveform generator include instructions for configuring a frequency offset signal generator to generate a plurality of different frequency offset tones, and instructions for configuring each of a plurality of frequency offset modulation mixers to mix the transmit reference signal with one of the plurality of different frequency offset tones, thereby generating a frequency offset transmit reference signal as one of the N radio frequency encoded transmit signals. In other embodiments, the instructions for configuring the waveform generator include instructions for configuring each of a plurality of fast-time phase shifters to receive and phase-shift the transmit reference signal, thereby generating a frequency offset transmit reference signal as one of the N radio frequency encoded transmit signals. The computer program product may also instructions that, when executed by the by one or more processors, causes the radar system to construct a MIMO virtual array by extracting information corresponding to the N radio frequency encoded transmit signals from the N consecutive segments in the range spectrum. The computer program product may also include instructions for configuring a signal encoder to encode the plurality of transmit signals using time division multiplexing to produce a first set of N radio frequency encoded transmit signals for transmission over a first set of N transmit antennas during a first time slot, and to produce a second set of N radio frequency encoded transmit signals for transmission over a second set of N transmit antennas during a second time slot.

In still yet another form, there is provided a radar architecture, circuit, method, and system. In the disclosed system, a reference signal generator is configured to produce a transmit reference signal a sequence of waveforms (e.g., a chirp signal). In addition, a reference signal generator is provided and configured to produce a transmit reference signal comprising a sequence of waveforms. In addition, a waveform generator is provided and configured to produce a plurality of transmit signals, each having a different frequency offset that is an integer multiple of an offset frequency $\Delta f$ from the transmit reference signal. In addition, a signal encoder is provided to encode the plurality of transmit signals using a signal conditioning and power amplification to produce N radio frequency encoded transmit signals for transmission over N transmit antennas, where the signal encoder is configured to encode the plurality of transmit signals using time division multiplexing to produce a first set of N radio frequency encoded transmit signals for transmission over a first set of N transmit antennas during a first time slot, and to produce a second set of N radio frequency encoded transmit signals for transmission over a second set of N transmit antennas during a second time slot. The system also includes a receiver with at least a first receive antenna for receiving a target return signal reflected from the first and second sets of N radio frequency encoded transmit signals by a target. The system receiver also includes a downconverter configured to mix the target return signal with the transmit reference signal, thereby producing an intermediate frequency signal. The system receiver also includes a high-speed analog-to-digital converter connected to convert the intermediate frequency signal to a digital signal. In selected embodiments, the analog-to-digital converter has a sampling rate $f_s$ of at least 2N times the offset frequency $\Delta f$. Finally, the system includes a radar control processing unit configured to process the digital signal with fast time processing steps to generate a range spectrum comprising N segments which correspond, respectively, to the N radio frequency encoded transmit signals transmitted in the first and second sets of N radio frequency encoded transmit signals.

Although the described exemplary embodiments disclosed herein focus on example automotive radar circuits, systems, and methods for using same, the present invention is not necessarily limited to the example embodiments illustrate herein. For example, various embodiments of a co-located or distributed aperture radar may be applied in non-automotive applications, and may use additional or fewer circuit components than those specifically set forth. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A radar system comprising:
   a reference signal generator configured to produce a transmit reference signal comprising a sequence of waveforms;
   a waveform generator comprising a plurality of fast-time phase shifters which are each connected to receive the transmit reference signal and which are configured to produce a plurality of transmit signals, each having a different frequency offset from the transmit reference signal;
   a signal encoder to encode the plurality of transmit signals using a signal conditioning and power amplification to produce and transmit N radio frequency encoded transmit signals over N transmit antennas;
   at least a first receive antenna for receiving a target return signal reflected from the N radio frequency encoded transmit signals by a target;
   a downconverter configured to mix the target return signal with the transmit reference signal, thereby producing an intermediate frequency signal;
   an analog-to-digital converter connected to convert the intermediate frequency signal to a digital signal; and
   a radar control processing unit configured to process the digital signal with fast time processing steps to generate a range spectrum comprising N segments which correspond, respectively, to the N radio frequency encoded transmit signals transmitted over the N transmit antennas.

2. The radar system of claim 1, where the radar control processing unit is further configured to construct a MIMO virtual array by extracting information corresponding to the N radio frequency encoded transmit signals from the N consecutive segments in the range spectrum.

3. The radar system of claim 1, where the analog-to-digital converter has a sampling rate of at least N times of the minimally required sampling rate of a single-transmitter system that detects targets unambiguously in range.

4. The radar system of claim 1, where each of the plurality of fast-time phase shifters is connected to receive the transmit reference signal and to generate a frequency offset modulated encoded transmit signals.

5. The radar system of claim 1, where the plurality of fast-time phase shifters comprises a bank of K-bit phase shifters for introducing a regular progressive phase shift to the transmit reference signal at fast-time sampling intervals.

6. The radar system of claim 1, where the signal encoder is configured to encode the plurality of transmit signals using time division multiplexing to produce a first set of N/2 radio frequency encoded transmit signals for transmission over a first set of N/2 transmit antennas during a first time slot, and to produce a second set of N/2 radio frequency encoded transmit signals for transmission over a second set of N/2 transmit antennas during a second time slot.

7. The radar system of claim 6, where the signal encoder is configured to encode the plurality of transmit signals using time division multiplexing by activating even-numbered transmit antennas for transmitting the first set of N/2 radio frequency encoded transmit signals during the first time slot, and by activating odd-numbered transmit antennas for transmitting the second set of N/2 radio frequency encoded transmit signals during the second time slot.

8. The radar system of claim 1, further comprising a notch filter bank connected between the downconverter and the analog-to-digital converter for filtering the intermediate frequency signal to remove zero-range interference in a fast-time spectrum of each transmitter.

9. The radar system of claim 1, where the downconverter comprises an I/Q mixer which is connected to first and second analog-to-digital converters which respectively convert the intermediate frequency signal to an I-channel digital signal and Q-channel digital signal.

10. A method for operating a radar system, comprising:
    generating a transmit reference signal comprising a sequence of chirp waveforms at a transmitter module;
    generating a plurality of transmit signals from the transmit reference signal at the transmitter module using a plurality of fast-time phase shifters which are connected to receive the transmit reference signal and configured to produce a plurality of transmit signals, each having a different frequency offset from the transmit reference signal;
    encoding the plurality of transmit signals using a signal conditioning and power amplification at the transmitter module to produce N radio frequency encoded transmit signals;
    transmitting the N radio frequency encoded transmit signals over N transmit antennas at the transmitter module;
    receiving, at least a first receive antenna of a receiver module, a target return signal reflected from the N radio frequency encoded transmit signals by a target;
    mixing the target return signal with the transmit reference signal at the receiver module to produce an intermediate frequency signal;

converting the intermediate frequency signal to a digital signal with an analog-to-digital converter at the receiver module; and processing the digital signal with fast time processing steps to generate a range spectrum comprising N segments which correspond, respectively, to the N radio frequency encoded transmit signals transmitted over the N transmit antennas.

11. The method of claim 10, further comprising constructing a MIMO virtual array by extracting information corresponding to the N radio frequency encoded transmit signals from the N consecutive segments in the range spectrum.

12. The method of claim 10, where generating the plurality of transmit signals comprises:

generating a plurality of different frequency offset tones; and mixing the transmit reference signal with each of the plurality of frequency offset tones to generate the plurality of transmit signals.

13. The method of claim 12, where a frequency offset generator generates the plurality of different frequency offset tones, and where a plurality of frequency offset modulation mixers are connected to mix the transmit reference signal with one of the plurality of different frequency offset tones.

14. The method of claim 10, where generating the plurality of transmit signals comprises phase-shifting the transmit reference signal with the plurality of fast-time phase shifters in response to a plurality of phase shift control signals to generate the plurality of transmit signals.

15. The method of claim 14, where phase-shifting the transmit reference signal comprises applying the transmit reference signal to a bank of K-bit phase shifters to phase-shift the transmit reference signal by introducing a regular progressive phase shift to the transmit reference signal at fast-time sampling intervals.

16. The method of claim 10, where encoding the plurality of transmit signals comprises encoding the plurality of transmit signals using time division multiplexing to produce a first set of N/2 radio frequency encoded transmit signals for transmission over a first set of N/2 transmit antennas during a first time slot, and to produce a second set of N/2 radio frequency encoded transmit signals for transmission over a second set of N/2 transmit antennas during a second time slot.

17. The method of claim 16, where encoding the plurality of transmit signals using time division multiplexing comprises activating even-numbered transmit antennas for transmitting the first set of N/2 radio frequency encoded transmit signals during the first time slot, and activating odd-numbered transmit antennas for transmitting the second set of N/2 radio frequency encoded transmit signals during the second time slot.

18. A radar system comprising:

a reference signal generator configured to produce a transmit reference signal comprising a sequence of chirp waveforms;

a waveform generator comprising a plurality of fast-time phase shifters which are each connected to receive the transmit reference signal and which are configured to produce a plurality of transmit signals, each having a different frequency offset that is an integer multiple of an offset frequency $\Delta f$ from the transmit reference signal;

a signal encoder to encode the plurality of transmit signals using a signal conditioning and power amplification to produce N radio frequency encoded transmit signals for transmission over N transmit antennas, where the signal encoder is configured to encode the plurality of transmit signals using time division multiplexing to produce a first set of N radio frequency encoded transmit signals for transmission over a first set of N transmit antennas during a first time slot, and to produce a second set of N radio frequency encoded transmit signals for transmission over a second set of N transmit antennas during a second time slot;

at least a first receive antenna for receiving a target return signal reflected from the first and second sets of N radio frequency encoded transmit signals by a target;

a downconverter configured to mix the target return signal with the transmit reference signal, thereby producing an intermediate frequency signal;

an analog-to-digital converter connected to convert the intermediate frequency signal to a digital signal; and a radar control processing unit configured to process the digital signal with fast time processing steps to generate a range spectrum comprising N segments which correspond, respectively, to the N radio frequency encoded transmit signals transmitted in the first and second sets of N radio frequency encoded transmit signals.

19. The radar system of claim 18, where the analog-to-digital converter has a sampling rate $f_s$ of at least 2N times the offset frequency $\Delta f$.

* * * * *